(12) United States Patent
Jones

(10) Patent No.: US 11,565,143 B2
(45) Date of Patent: Jan. 31, 2023

(54) CLAMPING DEVICE

(71) Applicant: Coulter Ventures, LLC., Columbus, OH (US)

(72) Inventor: Dylan Jones, Santa Barbara, CA (US)

(73) Assignee: Coulter Ventures, LLC., Columbus, OH (US)

( * ) Notice: Subject to any disclaimer, the term of this patent is extended or adjusted under 35 U.S.C. 154(b) by 344 days.

(21) Appl. No.: 16/696,149

(22) Filed: Nov. 26, 2019

(65) Prior Publication Data

US 2020/0171339 A1 Jun. 4, 2020

Related U.S. Application Data

(60) Provisional application No. 62/773,363, filed on Nov. 30, 2018.

(51) Int. Cl.
*A63B 21/072* (2006.01)
*F16B 2/06* (2006.01)

(52) U.S. Cl.
CPC .......... *A63B 21/0728* (2013.01); *F16B 2/06* (2013.01); *Y10T 403/595* (2015.01)

(58) Field of Classification Search
CPC ..... A63B 21/0728; B65D 45/345; F16B 2/06; F16B 2/08; F16B 2/18; F16B 2/185; F16B 7/1454; Y10T 24/1424; Y10T 403/595; Y10T 403/7071
USPC ............... 482/107; 403/322.4, 375.5; 24/273
See application file for complete search history.

(56) References Cited

U.S. PATENT DOCUMENTS

| | | |
|---|---|---|
| 1,303,249 A | 5/1919 | Brown |
| 2,108,407 A | 2/1938 | Lockhart |
| 2,194,162 A * | 3/1940 | Conner ................ B65D 45/345 |
| | | 292/256.69 |
| 2,244,351 A | 6/1941 | Venables |
| 2,775,806 A | 1/1957 | Love |
| 3,113,791 A | 12/1963 | Frost et al. |
| 3,305,234 A | 2/1967 | Cline et al. |
| 4,492,005 A | 1/1985 | Begley et al. |

(Continued)

FOREIGN PATENT DOCUMENTS

| | | |
|---|---|---|
| EP | 297527 4 A1 | 1/2016 |
| FR | 2699969 A1 | 7/1994 |

(Continued)

OTHER PUBLICATIONS

Product listing for Muscle Clamps from https://www.roguefitness.com/muscle-clamps , dated Sep. 19, 2018, product known to be available as of Nov. 13, 2014.

(Continued)

*Primary Examiner* — Josh Skroupa
(74) *Attorney, Agent, or Firm* — Banner & Witcoff, Ltd.

(57) ABSTRACT

A clamping device, such as a barbell collar, includes a primary member having a cylindrical body with a central passage configured to receive a mounting member therethrough, an actuator mechanism connected to the primary member and moveable between a locked position, where the primary member securely engages the mounting member, and an unlocked position, where the primary member is removable from the mounting member. The clamping device also includes a retaining mechanism configured to releasably retain the actuator in the unlocked position.

29 Claims, 30 Drawing Sheets

(56) References Cited

U.S. PATENT DOCUMENTS

| | | | |
|---|---|---|---|
| 4,569,105 A | 2/1986 | Weider | |
| 4,639,979 A | 2/1987 | Polson | |
| 4,646,398 A | 3/1987 | Myhrman | |
| 4,678,216 A * | 7/1987 | Gregory | B65D 45/345 292/256.69 |
| 5,020,839 A * | 6/1991 | Kalb | B65D 45/345 24/272 |
| 5,062,631 A | 11/1991 | Dau et al. | |
| 5,207,624 A | 5/1993 | Paskovich | |
| 5,295,604 A * | 3/1994 | Van Ryswyk | B65D 45/345 24/272 |
| 5,295,933 A | 3/1994 | Ciminski et al. | |
| 5,548,876 A * | 8/1996 | Oetiker | B65D 63/02 24/273 |
| 5,591,109 A | 1/1997 | Strnad | |
| D384,710 S | 10/1997 | Pahel | |
| 5,829,106 A * | 11/1998 | Dams | B65D 45/345 24/273 |
| D582,230 S | 12/2008 | Lin | |
| D584,604 S | 1/2009 | Baldwin | |
| 7,497,489 B2 | 3/2009 | Baughman et al. | |
| 7,513,856 B2 | 4/2009 | Jones | |
| 7,789,814 B1 | 9/2010 | Xu | |
| 8,142,335 B1 | 3/2012 | Leach et al. | |
| D694,841 S | 12/2013 | Ciminski et al. | |
| D711,730 S | 8/2014 | McKiernan | |
| D712,730 S | 9/2014 | Gridley | |
| 8,827,878 B1 | 9/2014 | Ciminski et al. | |
| D735,025 S | 7/2015 | Mathien | |
| 9,109,616 B1 | 8/2015 | Ballentine | |
| D764,608 S | 8/2016 | Jones | |
| D766,384 S | 9/2016 | Jones | |
| D780,859 S | 3/2017 | Ramsey et al. | |
| D780,860 S | 3/2017 | Jones | |
| D780,861 S | 3/2017 | Jones | |
| 9,764,183 B2 | 9/2017 | Roepke | |
| 9,855,458 B2 | 1/2018 | Stilson | |
| 9,933,001 B2 | 4/2018 | Gardiner | |
| 10,226,659 B2 | 3/2019 | Stilson | |
| 10,259,619 B2 * | 4/2019 | Search | B65D 45/345 |
| 10,274,691 B2 * | 4/2019 | Janssens | F16B 2/185 |
| D855,920 S | 8/2019 | Schenone et al. | |
| D861,473 S | 10/2019 | Yesavage et al. | |
| D865,881 S | 11/2019 | Muir et al. | |
| 10,512,815 B2 | 12/2019 | Stilson | |
| D876,944 S | 3/2020 | Fleck et al. | |
| 10,619,777 B2 * | 4/2020 | Search | B65D 45/345 |
| 10,953,263 B2 | 3/2021 | Stilson | |
| D941,408 S | 1/2022 | Jones | |
| D950,656 S | 5/2022 | Andersson | |
| 2008/0287271 A1 | 11/2008 | Jones | |
| 2011/0162173 A1 | 7/2011 | Ciminski et al. | |
| 2012/0324682 A1 | 12/2012 | Ballentine | |
| 2013/0072359 A1 | 3/2013 | Leach et al. | |
| 2013/0196830 A1 | 8/2013 | Pfitzer | |
| 2014/0121075 A1 | 5/2014 | Brown | |
| 2014/0162855 A1 | 6/2014 | Beckman | |
| 2014/0200119 A1 | 7/2014 | Sides, Jr. | |
| 2014/0287889 A1 | 9/2014 | Grace et al. | |
| 2015/0231441 A1 | 8/2015 | Davies, III | |
| 2016/0025121 A1 | 1/2016 | Ahnert et al. | |
| 2017/0095688 A1 | 4/2017 | Stilson | |
| 2017/0144012 A1 | 5/2017 | Stilson | |
| 2018/0185696 A1 | 7/2018 | Stilson | |
| 2018/0326251 A1 | 11/2018 | Stilson | |
| 2019/0105525 A1 | 4/2019 | Stilson | |
| 2020/0171339 A1 | 6/2020 | Jones | |
| 2021/0001165 A1 | 1/2021 | Stilson | |
| 2021/0001166 A1 | 1/2021 | Stilson | |
| 2022/0143453 A1 | 5/2022 | Martin | |

FOREIGN PATENT DOCUMENTS

| | | |
|---|---|---|
| GB | 685710 A | 1/1953 |
| GB | 2186500 A | 8/1987 |
| GB | 2397254 A | 7/2004 |
| WO | 2015134826 A2 | 9/2015 |
| WO | 2017046731 A1 | 3/2017 |

OTHER PUBLICATIONS

Product listing for Rogue Proloc Collars from https://www.roguefitness.com/rogue-proloc-collars <https://protect-us.mimecast.com/s/TToSCJ6EZ1Hq79YNCzQJ-u>, dated Sep. 19, 2018, product known to be available as of Nov. 13, 2014.

Product listing for Rogue Spring Collars from https://www.roguefitness.com/spring-collars <https://protect-us.mimecast.com/s/UoN0CKrAOGU2j7nVhAF1Rn>, dated Sep. 19, 2018, product known to be available as of Nov. 13, 2014.

Product listing for Rogue HG Collars from https://web.archive.org/web/20141007093507/http://www roguefitness.com/rogue-hg-collars <https://protect-us.mimecast.com/s/aGhgCL9AgGTRJB16Uj2ere>, dated Oct. 7, 2014.

Product listing for Rogue Proloc Blocker from https://www.roguefitness.com/proloc-blocker <https:///protect-us.mimecast.com/s/hhCoCM87jXUqQBZNC1egc1>, dated Sep. 19, 2018, product known to be available as of Nov. 13, 2014.

Product listing for Rogue Proloc 2 Chain Collars from https://www.roguefitness.com/rogue-proloc-2-collars-pair <https://protect-us.mimecast.com/s/JjvwCNk7xGi02kB4SzG9Mh>, dated Sep. 19, 2018, product known to be available as of Nov. 13, 2014.

Product listing for Rogue Metal HG Collars from https://web.archive.org/web/20151012215636/http://www.roguefitness.com:80/rogue-metal-hg-collars <https://web.archive.org/web/20151012215636/http:/www.roguefitness.com:80/rogue-metal-hg-collars>, dated Oct. 12, 2015.

Product listing for Eleiko International Collars from https://www.ebay.co.uk/itm/Eleiko-Olympic-Weight-Lifting-Training-Collars-Clips-IWF-IPF-approved-Commercial-/112533462103 <https://protect-us.mimecast.com/s/QT5hCPN61GHK7zxpSmm68r>, dated Sep. 19, 2018, product known to be available as of Nov. 13, 2014.

Product listing for Eleiko Competition Collars from https://web.archive.org/web/20120228055629/http://www.roguefitness.com:80/eleiko-collars.php <https://protect-us.mimecast.com/s/XN4sCQWA1Xtk5vW0tO9d6->, dated Feb. 28, 2012.

Product listing for Ader Spring Collars from https://web.archive.org/web/20131119152405/http://www.roguefitness.com:80/ader-spring-collars.php <https://protect-us.mimecast.com/s/P2ArCR68gXHvA4L2SE86Hr>, dated Nov. 19, 2013.

Product listing for Rogue Metal Axle Collars from https://web.archive.org/web/20141010232044/http://www.roguefitness.com:80/rogue-metal-axle-collars <https://protect-us.mimecast.com/s/IbPeCVOJmWSxDqAGCNS7Ob>, dated Oct. 10, 2014.

Product listing for Uesaka Sevi Competition Collars from https://web.archive.org/web/20151118052603/http://www.roguefitness.com:80/uesaka-sevi-competition-collars <https://protect-us.mimecast.com/s/U8ORCW6Wn1H5ArBJCJfNS4>, dated Nov. 18, 2015, product known to be available as of Nov. 15, 2015.

Product listing for Rogue Proloc Collars Red from https://www.roguefitness.com/rogue-proloc-collars-red <https://protect-us.mimecast.com/s/2xHFCXDY6PHXxEYwSX9zez>, dated Sep. 19, 2018, product known to be available as of Nov. 13, 2014.

Product listing showing Strongman Specialty Barbell Spring Clamp from https://web.archive.org/web/20120223160336/ https://www.roguefitness.com/rogue-farmers-walk-handles.php <https://protect-us.mimecast.com/s/4MLBCBB1gvS7gxQ6TzGBZ_>, dated Feb. 23, 2012.

Web page https://web.archive.org/web/20151113160442/http://www.roguefitness.com:80/weightlifting-bars-plates/collars <https://web.archive.org/web/20151113160442/http:/www.roguefitness.com:80/weightlifting-bars-plates/collars>, dated Nov. 13, 2015.

Web page https://web.archive.org/web/20141007081926/http://www.roguefitness.com/weightlifting-bars-plates/collars <https://web.

(56) References Cited

OTHER PUBLICATIONS archive.org/web/20141007081926/http:/www.roguefitness.com/weightlifting-bars-plates/collars>, dated Oct. 7, 2014.
Web Page https://web.archive.org/web/20150826081003/http://www.roguefitness.com:80/weightlifting-bars-plates/collars <https://web.archive.org/web/20150826081003/http:/www.roguefitness.com:80/weightlifting-bars-plates/collars>, dated Aug. 26, 2015.
Photograph of Berg Hantel Collar, publicly disclosed prior to Nov. 1, 2018.
Photograph of IWF Certified Eleiko Collar, publicly disclosed prior to Nov. 1, 2018.
Image 3: Photograph of IWF Certified Eleiko Collar, publicly disclosed prior to Nov. 1, 2018.
Product listing for Eleiko IWF Weightlifting Competition Collars from https://www.eleiko.com/en/p/eleiko-iwf-weightlifting-competition-collars-pair/73#gs.3ba0s7, dated Apr. 8, 2020, product available prior to Nov. 1, 2018.
RogueFitness, "Rogue USA Aluminum Collars", Apr. 20, 2020. https://www.roguefitness.com/rogue-usa-aluminum-collars?bvstate=pg:2/ct:r. Shown on p. 1. (Year: 2020).
"Collars—Rogue HG 2.0 Collars", Jul. 3, 2017, roguefitness.com via archive.org, site visited Sep. 10, 2021: https://web.archive.org/web/20170703192542/https://www.roguefitness.com/weightlifting-bars-plates/collars (Year: 2017).

\* cited by examiner

CLAMPING DEVICE

CROSS-REFERENCE TO RELATED APPLICATION

This application is a non-provisional of, and claims priority to, U.S. Provisional Application No. 62/773,363, filed Nov. 30, 2018, which prior application is incorporated by reference herein.

FIELD OF THE INVENTION

This disclosure relates to clamping devices, and more specifically to clamping devices in the form of barbell clamps or other clamps designed to secure weights on exercise equipment.

BACKGROUND

A clamping device is an apparatus that engages one or more objects for the purpose of securely retaining the object or objects. Clamping devices in the form of barbell collars are commonly used during weight training in connection with a barbell with removable weights loaded on in it. Such a clamping device can be employed to resist separation of the removable weights of that assembly. Thus, a clamping device that can securely engage the barbell is desirable to prevent movement of the weights while on the barbell. It is desirable for a clamping device that is able remain securely engaged throughout the entire movement required of an exercise, as well as successive repetitions.

Various types of barbell collars and other clamping devices exist, and many include actuator mechanisms to tighten the clamping device to engage the barbell. Such actuator mechanisms may move freely when not tightly engaged, creating difficulty in installing the clamping device and controlling the position of the actuator.

The present disclosure is provided to address this need and other needs in existing clamping devices. A full discussion of the features and advantages of the present invention is deferred to the following detailed description, which proceeds with reference to the accompanying drawings.

BRIEF SUMMARY

General aspects of the present disclosure relate to a clamping device that includes a primary member having a cylindrical body with a central passage configured to receive a mounting member therethrough, an actuator mechanism connected to the primary member and moveable between a locked position, where the primary member securely engages the mounting member, and an unlocked position, where the primary member is removable from the mounting member, and a retaining mechanism configured to releasably retain the actuator in the unlocked position.

Aspects of the disclosure relate to a clamping device that includes a primary member having a cylindrical body extending between first and second ends with a passage configured to receive a mounting member therethrough and an actuator mechanism configured to move the primary member to securely engage the mounting member. The actuator mechanism includes an actuator connected to the primary member at a pivot connection and a pulling member connected to the primary member at a distal connection and connected to the actuator at an eccentric connection offset from the pivot connection. The actuator is moveable between a locked position, where the primary member is configured to securely engage the mounting member, and an unlocked position, where the primary member is removable from the mounting member, and movement of the actuator from the unlocked position to the locked position is configured to move the pulling member to pull the first and second ends of the primary member closer together to cause the primary member to securely engage the mounting member. The device also has a retaining mechanism including complementary locking members on the actuator and the pulling member configured to engage each other to releasably retain the actuator in the unlocked position.

According to one aspect, the actuator includes first and second arms pivotably connected to the primary member at the pivot connection and a handle extending outwardly from the first and second arms, with a slot defined between the first and second arms. In this configuration, the pulling member is received within the slot and the eccentric connection connects the pulling member to the first and second arms. In one configuration, the locking member of the actuator includes a flexible tab located within the slot, and the locking member of the pulling member includes a rigid lip configured to engage the flexible tab.

According to another aspect, the first end of the cylindrical body has a first slot and the second end of the cylindrical body has a second slot. The pivot connection connects the actuator to the primary member at the first end such that a portion of the actuator is received in the first slot, and the distal connection connects the pulling member to the primary member at the second end such that a portion of the pulling member is received in the second slot.

According to a further aspect, the actuator is further moveable to an intermediate unlocked position rotationally between the locked position and the unlocked position. When the actuator is in the intermediate unlocked position, the primary member is removable from the mounting member and the complementary locking members do not retain the actuator in the intermediate unlocked position.

According to yet another aspect, the cylindrical body has an inner surface defining the passage, and the clamping device further includes a gripping member connected to the inner surface of the cylindrical body and extending around a portion of the passage. The gripping member is configured to engage the mounting member when the mounting member is received in the passage.

According to a still further aspect, the cylindrical body is formed of a single, integral piece of a metallic material.

According to another aspect, the complementary locking members include a rigid lip on one of the actuator and the pulling member and a flexible retaining tab on the other of the actuator and the pulling member, wherein the flexible retaining tab is configured to engage the rigid lip to releasably retain the actuator in the unlocked position.

Additional aspects of the disclosure relate to a clamping device that includes a primary member having a cylindrical body extending between first and second ends, with a passage configured to receive a mounting member therethrough, and an actuator mechanism configured to move the primary member to securely engage the mounting member. The actuator mechanism includes an actuator engaged with the primary member that is moveable between a locked position, where the primary member is configured to securely engage the mounting member, and an unlocked position, where the primary member is removable from the mounting member. Movement of the actuator from the unlocked position to the locked position is configured to cause the actuator mechanism to move the first and second ends of the primary member closer together to cause the primary member to securely engage the mounting member. The device also includes a retaining mechanism configured to releasably retain the actuator in the unlocked position, where the retaining mechanism includes a retaining tab on the actuator and a complementary retaining member configured to engage the retaining tab to releasably retain the actuator in the unlocked position.

According to one aspect, the actuator is connected to the first end of the cylindrical body, and the actuator mechanism further includes a pulling member connected to the actuator and connected to the second end of the cylindrical body, such that movement of the actuator from the unlocked position to the locked position is configured to pull the pulling member to pull the first and second ends together and decrease a width of the passage, and movement of the actuator from the locked position to the unlocked position is configured to move the first and second ends apart and increase the width of the passage. In one configuration, the first end of the cylindrical body has a first slot and the second end of the cylindrical body has a second slot, where a portion of the actuator is received in the first slot, and a portion of the pulling member is received in the second slot. In an additional embodiment, the actuator includes first and second arms pivotably connected to the primary member, with a slot defined between the first and second arms, and a handle extending outwardly from the first and second arms, where a second portion of the pulling member is received in the slot between the arms of the actuator.

According to another aspect, the actuator is further moveable to an intermediate unlocked position rotationally between the locked position and the unlocked position. When the actuator is in the intermediate unlocked position, the primary member is removable from the mounting member and the retaining mechanism does not retain the actuator in the intermediate unlocked position.

According to a further aspect, the cylindrical body has an inner surface defining the passage, and the clamping device further includes a gripping member connected to the inner surface of the cylindrical body and extending around a portion of the passage. The gripping member configured to engage the mounting member when the mounting member is received in the passage.

According to yet another aspect, the actuator and the retaining tab are formed as a single molded piece.

According to a still further aspect, the actuator is elongated, and the retaining tab extends both longitudinally outward and transverse to a direction of elongation of the actuator. The retaining tab is flexible and is configured to engage the complementary retaining member and flex toward the actuator when the actuator is moved from the locked position to the unlocked position.

Further aspects of the disclosure relate to a clamping device that includes a primary member having a cylindrical body, with a passage configured to receive a mounting member therethrough, and an actuator mechanism configured to move the primary member to securely engage the mounting member. The actuator mechanism includes an actuator engaged with the primary member that is moveable between a locked position, where the clamping device is configured to securely engage the mounting member, and an unlocked position, where the clamping device is removable from the mounting member, where movement of the actuator from the unlocked position to the locked position is configured to cause the actuator mechanism to move the primary member to securely engage the mounting member. The actuator includes first and second arms pivotably connected to the primary member, with a slot defined between the first and second arms, and a handle extending outwardly from the first and second arms. The device further has a retaining mechanism configured to releasably retain the actuator in the unlocked position. The retaining mechanism includes a flexible retaining tab extending outward from the actuator and positioned within the slot between the first and second arms, where the flexible retaining tab is configured to engage a complementary retaining member to releasably retain the actuator in the unlocked position.

According to one aspect, the cylindrical body has a first end and a second end spaced from the first end to define a gap, where the actuator is connected to the first end and the actuator mechanism further includes a pulling member connected to the actuator and connected to the second end. In this configuration, movement of the actuator from the unlocked position to the locked position is configured to pull the pulling member to pull the first and second ends together and decrease a width of the passage, and movement of the actuator from the locked position to the unlocked position is configured to move the first and second ends apart and increase the width of the passage. In one configuration, the first end of the cylindrical body has a first slot and the second end of the cylindrical body has a second slot, where a portion of the actuator is received in the first slot, and a portion of the pulling member is received in the second slot. In another configuration, a portion of the pulling member is additionally or alternately received in the slot between the arms of the actuator.

According to another aspect, the actuator is further moveable to an intermediate unlocked position rotationally between the locked position and the unlocked position. When the actuator is in the intermediate unlocked position, the primary member is removable from the mounting member and the retaining mechanism does not retain the actuator in the intermediate unlocked position.

According to a further aspect, the cylindrical body has an inner surface defining the passage, and the clamping device further includes a gripping member connected to the inner surface of the cylindrical body and extending around a portion of the passage. The gripping member is configured to engage the mounting member when the mounting member is received in the passage.

According to yet another aspect, the actuator and the flexible retaining tab are formed as a single molded piece.

According to a still further aspect, the actuator is elongated, and the flexible retaining tab extends both longitudinally outward and transverse to a direction of elongation of the actuator. The flexible retaining tab is configured to engage the complementary retaining member and flex toward the actuator when the actuator is moved from the locked position to the unlocked position.

Other aspects of the disclosure relate to a clamping device that includes a primary member having a cylindrical body extending between first and second ends, with a passage configured to receive a mounting member therethrough, and an actuator mechanism configured to move the primary member to securely engage the mounting member. The actuator mechanism includes an actuator connected to the primary member at a pivot connection and a pulling member connected to the primary member at a distal connection and connected to the actuator at an eccentric connection offset from the pivot connection. The actuator is moveable between a locked position, where the primary member is configured to securely engage the mounting member, and an unlocked position, where the primary member is removable from the mounting member, and movement of the actuator from the unlocked position to the locked position is configured to move the pulling member to pull the first and second ends of the primary member closer together to cause the primary member to securely engage the mounting member. The actuator has first and second arms pivotably connected to the primary member at the pivot connection and a handle extending outwardly from the first and second arms, with a slot defined between the first and second arms. The pulling member is received within the slot, and the eccentric connection connects the pulling member to the first and second arms. The device also has a retaining mechanism configured to releasably retain the actuator in the unlocked position. The retaining mechanism includes a flexible retaining tab extending outward from the actuator and positioned within the slot between the first and second arms. The retaining mechanism further includes a complementary retaining member configured to engage the flexible retaining tab to releasably retain the actuator in the unlocked position.

According to one aspect, the actuator and the flexible retaining tab are formed as a single molded piece, and/or the cylindrical body is formed of a single, integral piece of a metallic material.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
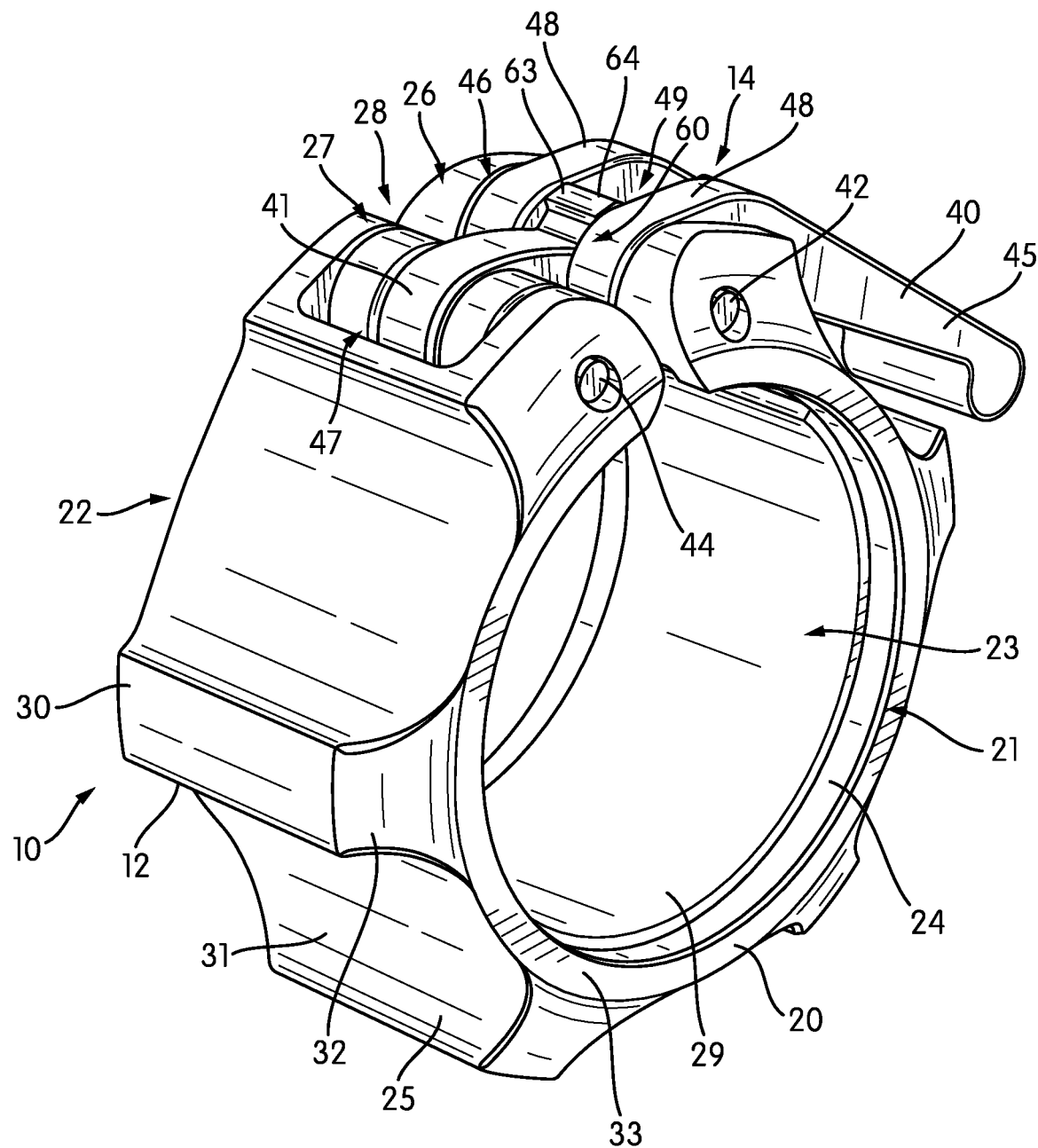
FIG. 1 is a front-right perspective view of one embodiment of a clamping device according to aspects of the disclosure, shown in a locked position.
Figure 2:
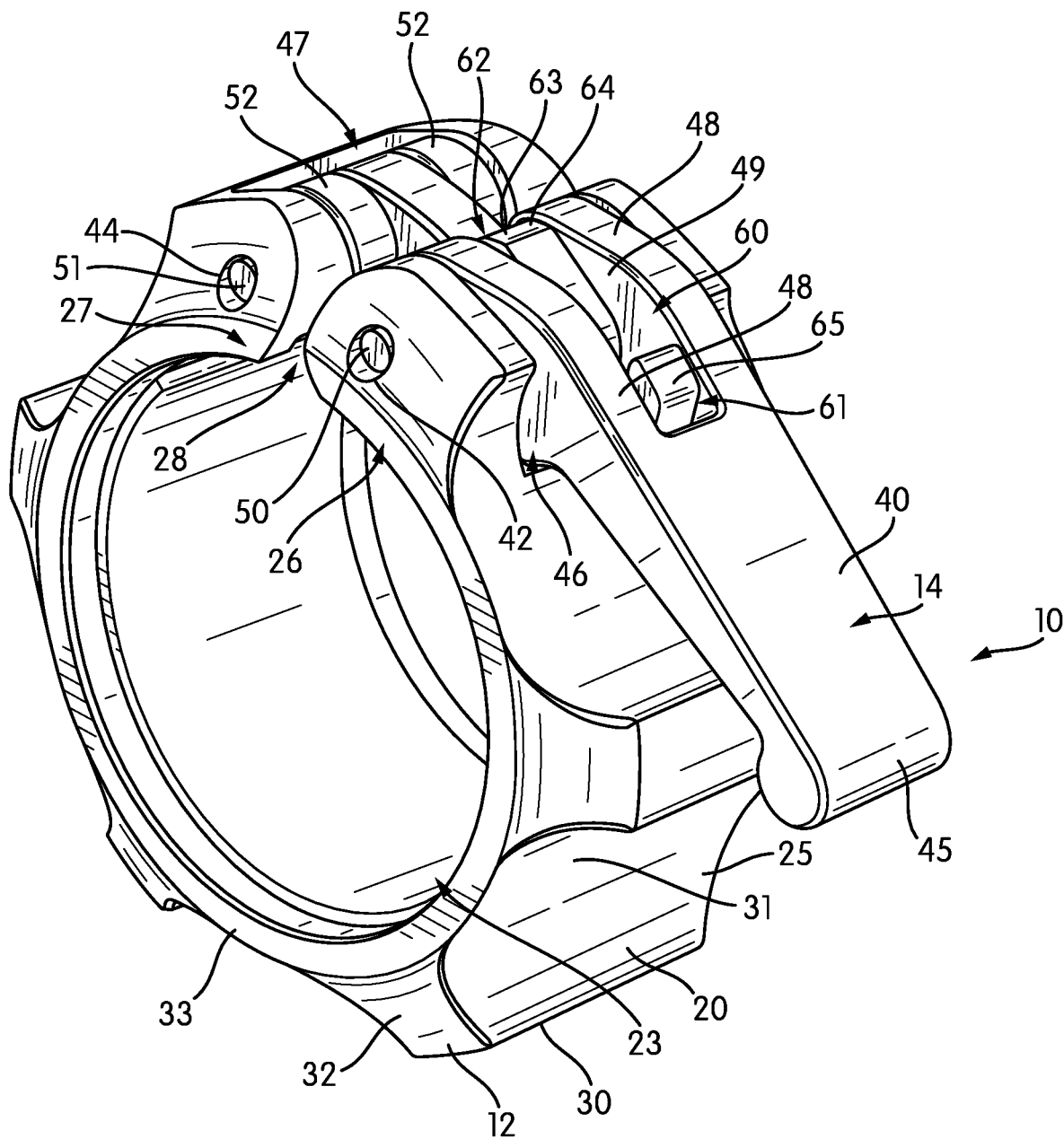
FIG. 2 is a front-left perspective view of the clamping device of FIG. 1.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Figure 6:
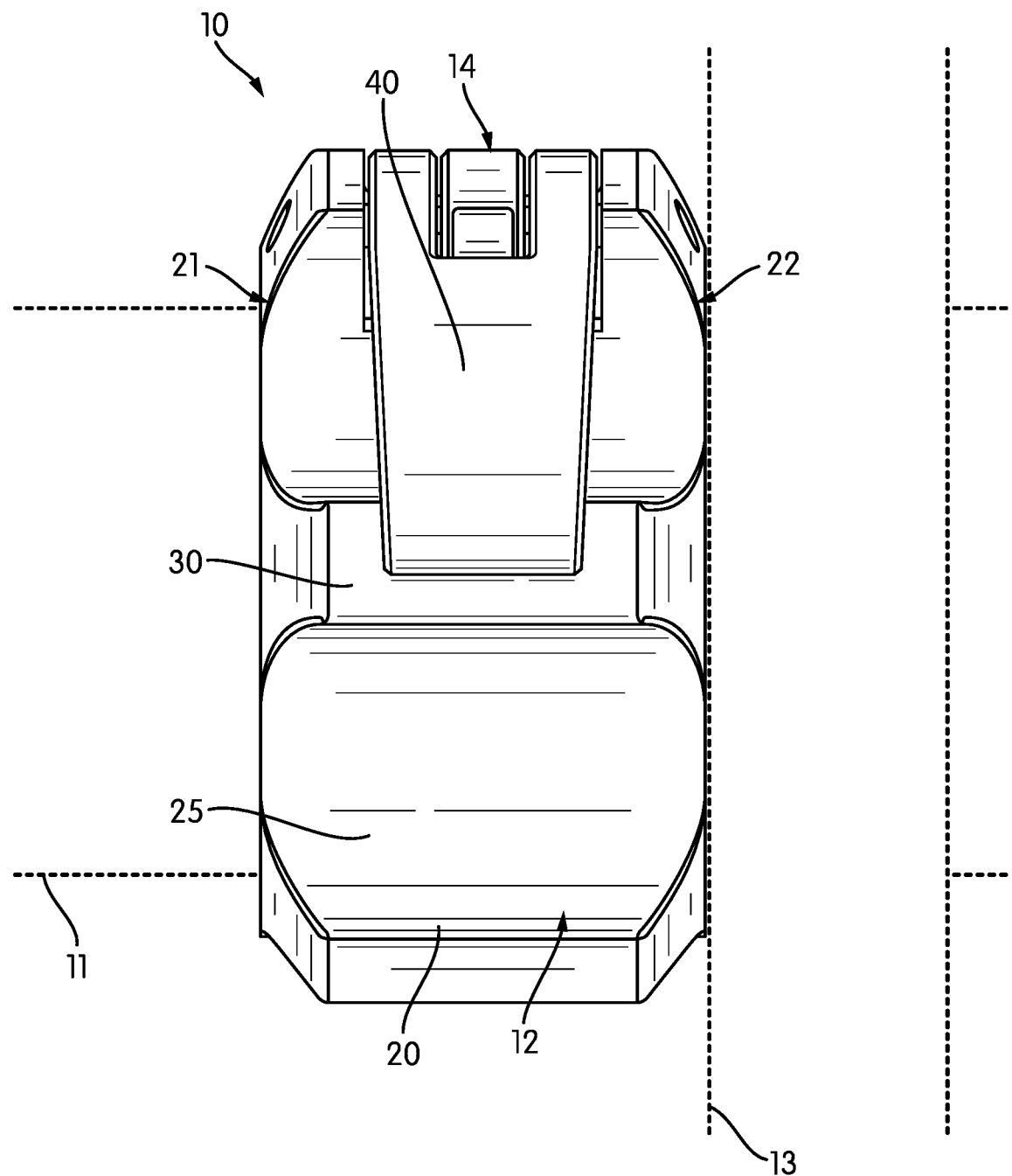
FIG. 6 is a left side view of the clamping device of FIG. 1, with broken lines illustrating the mounting member received within the passage of the clamping device and a weight positioned on the mounting member.
Figure 7:
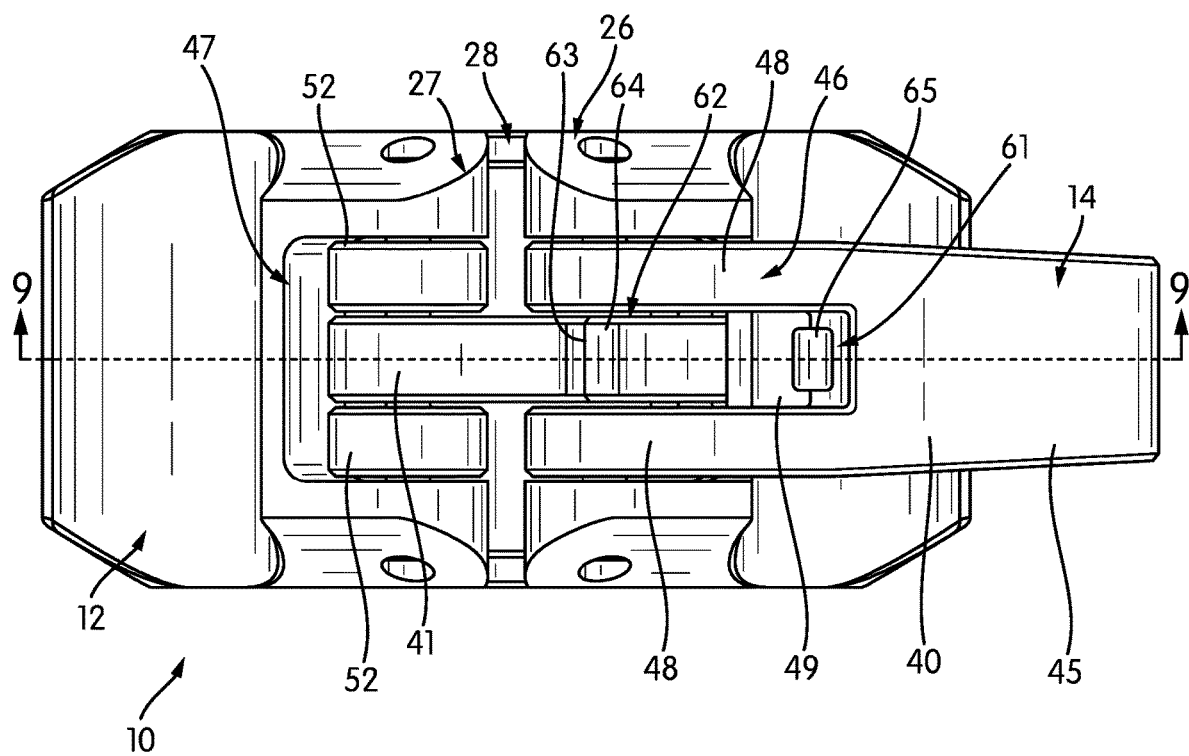
FIG. 7 is a top view of the clamping device of FIG. 1.
Figure 8:
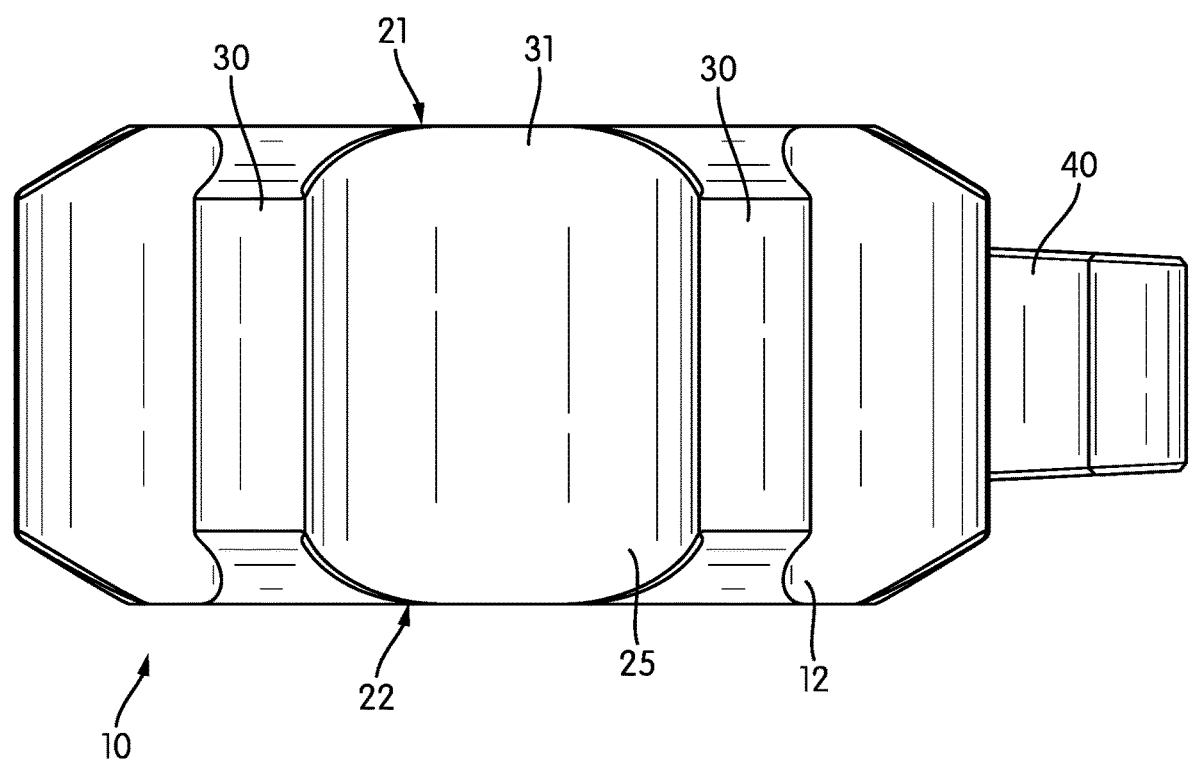
FIG. 8 is a bottom view of the clamping device of FIG. 1.
Figure 9:
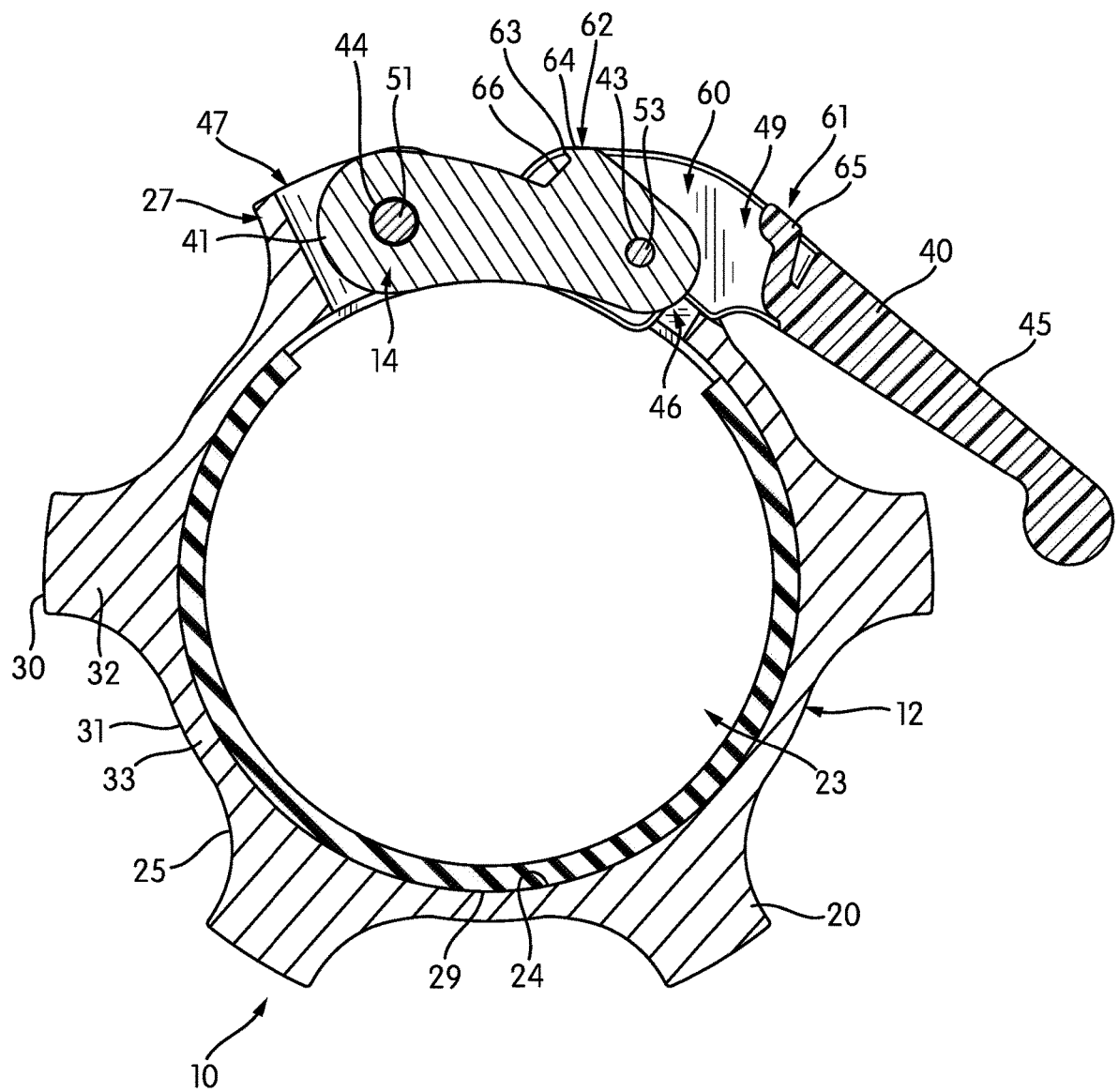
FIG. 9 is a cross-section view of the clamping device of FIG. 1, taken along line 9-9 of FIG. 7.
Figure 10:
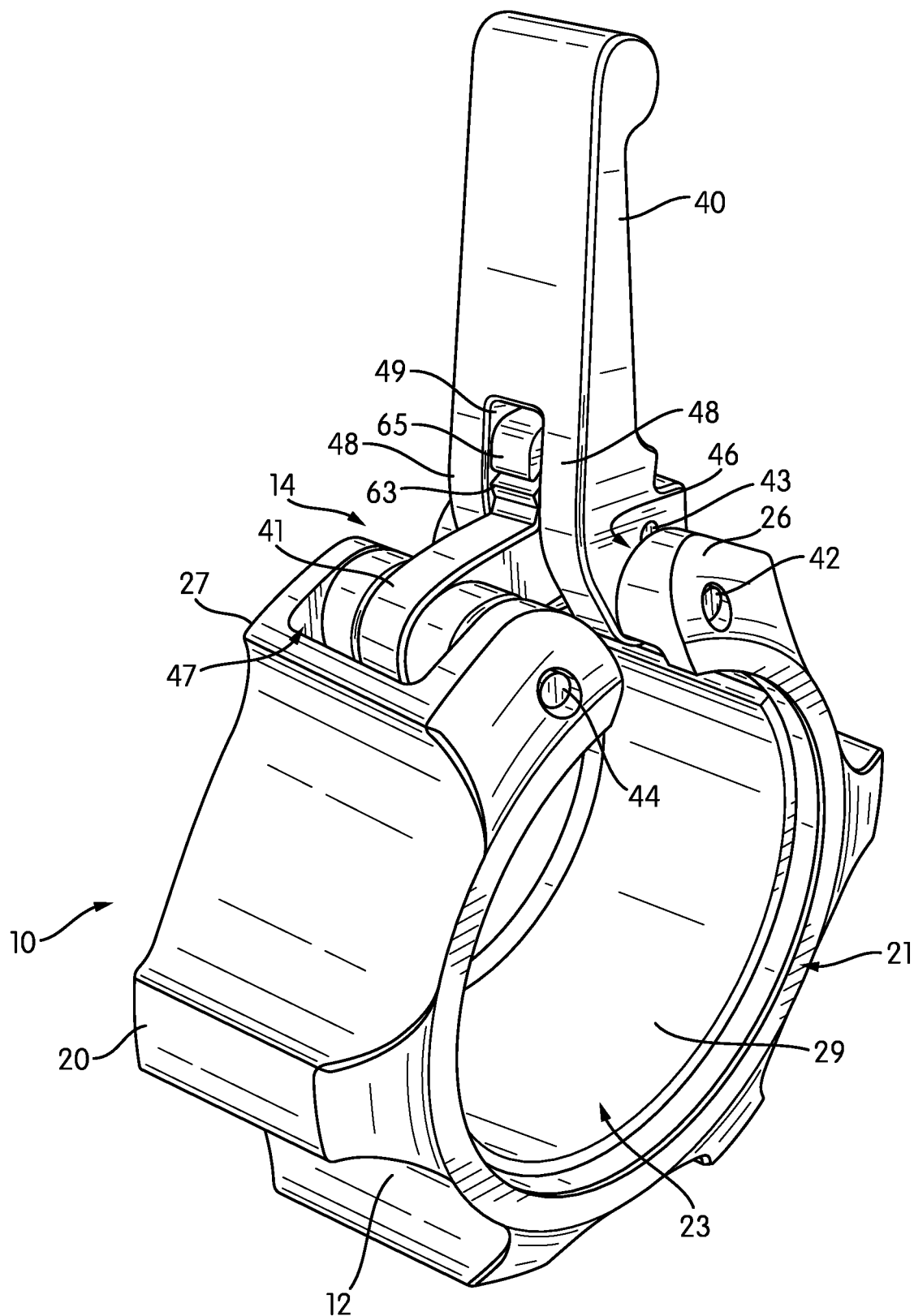
FIG. 10 is a front-right perspective view of the clamping device of FIG. 1, shown in an intermediate unlocked position.
Figure 11:
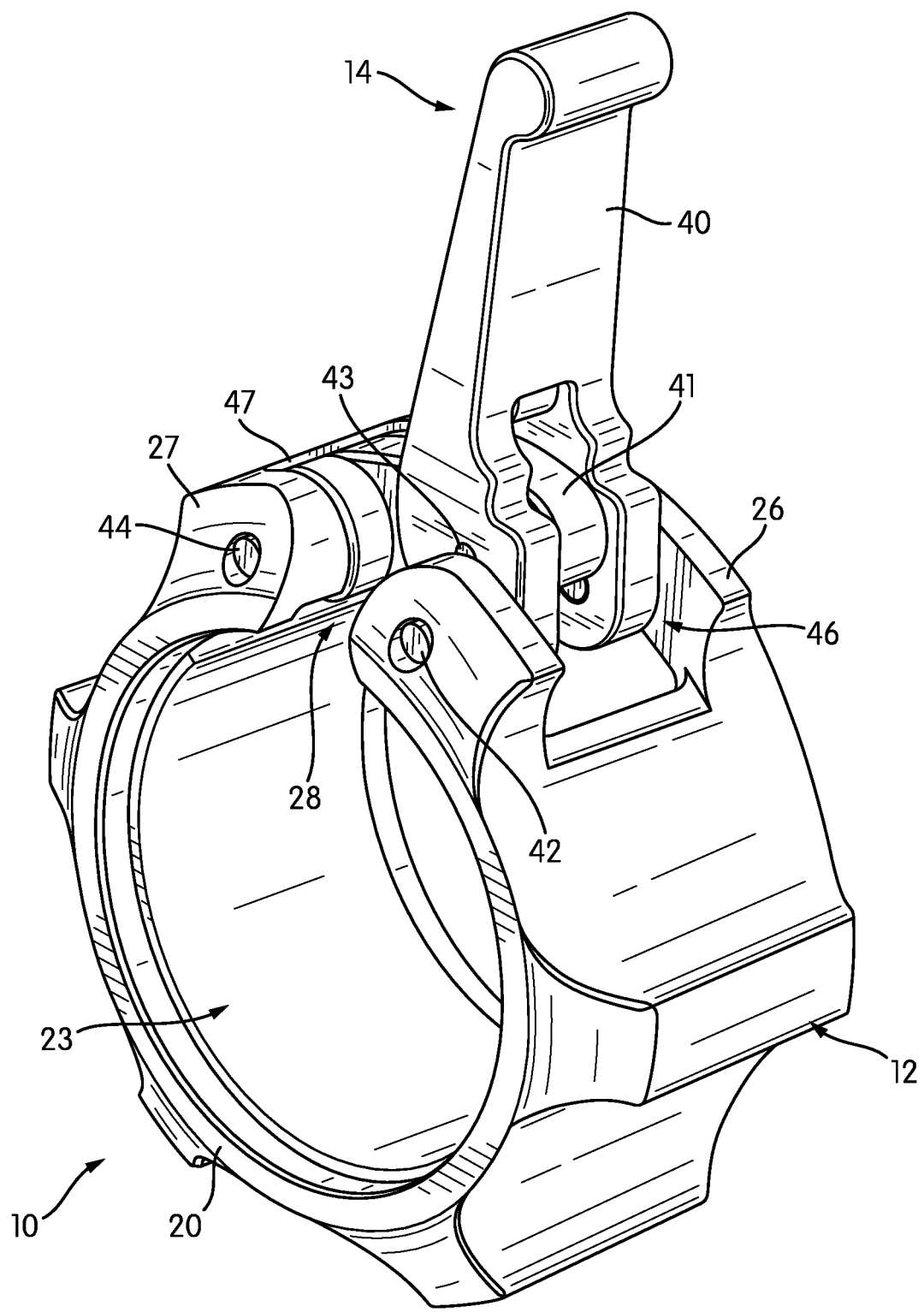
FIG. 11 is a front-left perspective view of the clamping device of FIG. 10.

FIGS. 1-27 illustrate one embodiment of a clamping device 10 according to aspects of the disclosure, which is designed to be connected to an elongated, cylindrical mounting member 11 (see FIG. 6). The clamping device 10 in this embodiment is configured for securing one or more weights 13 to the mounting member 11 (see FIG. 6), and the clamping device 10 may be provided in the form of a barbell clamp configured for connection to a mounting member 11 in the form of a barbell. The clamping device 10 in one embodiment includes at least a primary member or clamping member 12 and an actuator mechanism 14 configured to engage the primary member 12 and be moveable between at least a locked position, where the primary member 12 is configured to be securely engaged with the mounting member 11, and an unlocked position, where the primary member 12 is configured to not be securely engaged with the mounting member 11 and can be removed from the mounting member 11. As described below, in one embodiment, the actuator mechanism 14 may have multiple unlocked positions. FIGS. 1-9 illustrate the clamping device 10 with the actuator mechanism 14 in the locked position, FIGS. 10-27 illustrate the clamping device 10 with the actuator mechanism 14 in two different unlocked positions.

The primary member 12 in the embodiment of FIGS. 1-27 is generally annular and cylindrical in shape and includes a generally annular and cylindrical body 20 having a front side 21 and a rear side 22, with a circular central passage 23 extending through the cylindrical body 20 from the front side 21 to the rear side 22. The cylindrical body 20 also has an inner surface 24 defining the central passage 23, an outer surface 25 opposite the inner surface 24, and two ends 26, 27 having a gap 28 therebetween. The cylindrical body 20 extends from a first end 26 peripherally or circumferentially around the central passage 23 to the second end 27. In the embodiment of FIGS. 1-27, the primary member 12 also has one or more gripping members 29 positioned on the inner surface 25 and configured to engage the mounting member 11 to increase friction between the primary member 12 and the mounting member 11. In one embodiment, the cylindrical body 20 is at least partially or completely formed of a metallic material such as aluminum, or another alloy such as stainless steel or other steel, etc., and the gripping member(s) 29 may be formed of a softer material with a higher coefficient of friction, such as a rubber material, a polyurethane material, or other polymer material. The cylindrical body 20 may be formed of a single, integral piece of aluminum or other metallic material in one embodiment. In another embodiment, the cylindrical body 20 may be formed of multiple pieces, such as two or a plurality of pieces connected by jointed connections.

The cylindrical body 20 in FIGS. 1-27 has a plurality of alternating raised portions 30 and recessed portions 31 around the outer surface 25. In this embodiment, the outer surface 25 is a continuous surface that extends the entire width of the cylindrical body 20, i.e., from the front side 21 to the rear side 22, and also extends from the first end 26 to the second end 27. The raised portions 30 and recessed portions 31 in this configuration also extend the entire width of the cylindrical body 20. Additionally, in one embodiment, as shown in FIGS. 1-27, the raised portions 30 and recessed portions 31 are formed by alternating thick portions 32 and thin portions 33 of the cylindrical body 20, respectively, where the thin portions 33 have smaller thicknesses (defined between the inner and outer surfaces 24, 25) than the thick portions 32.

Figure 3:
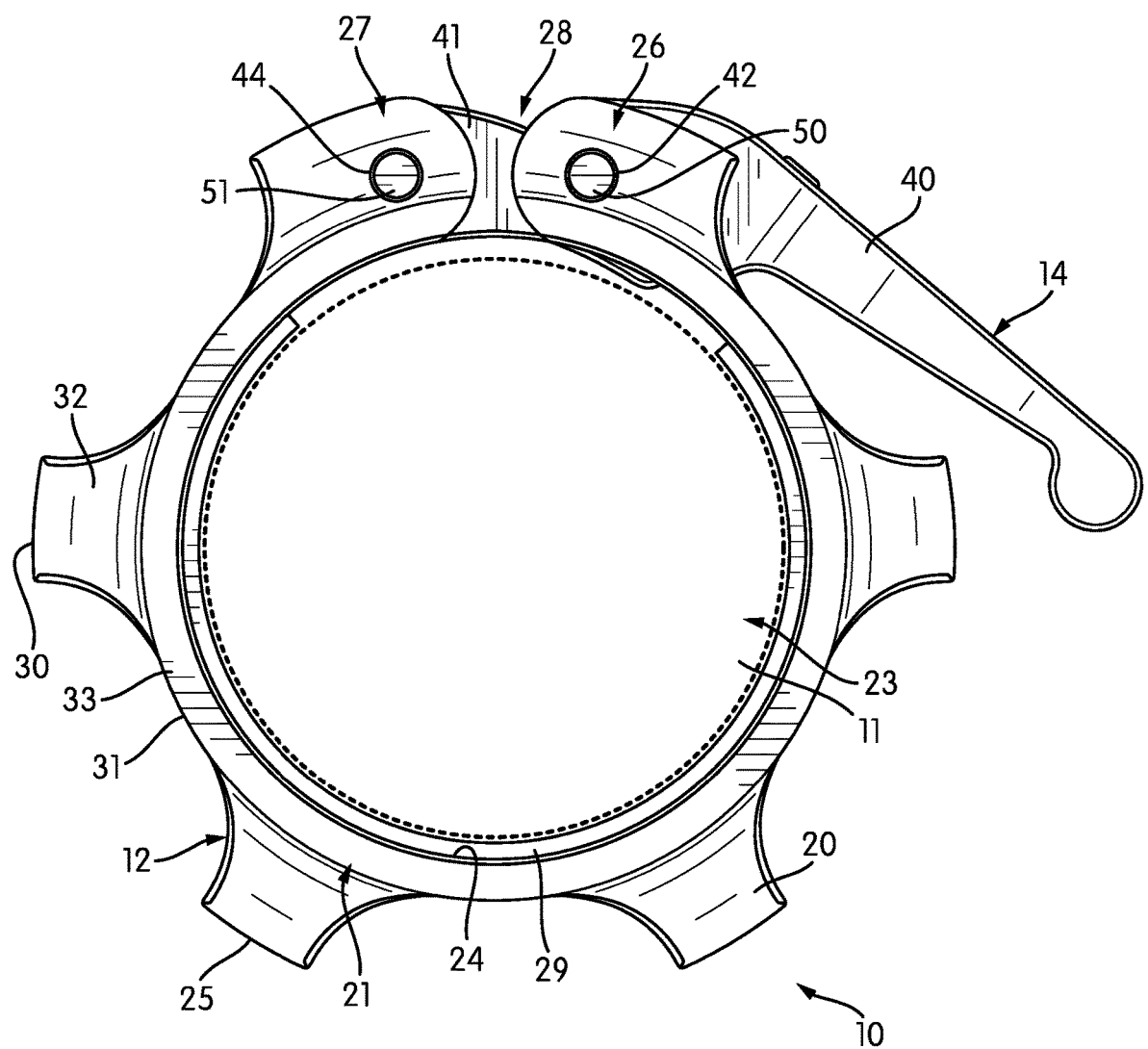
FIG. 3 is a front view of the clamping device of FIG. 1, with broken lines illustrating an mounting member received within a passage of the clamping device.
Figure 4:
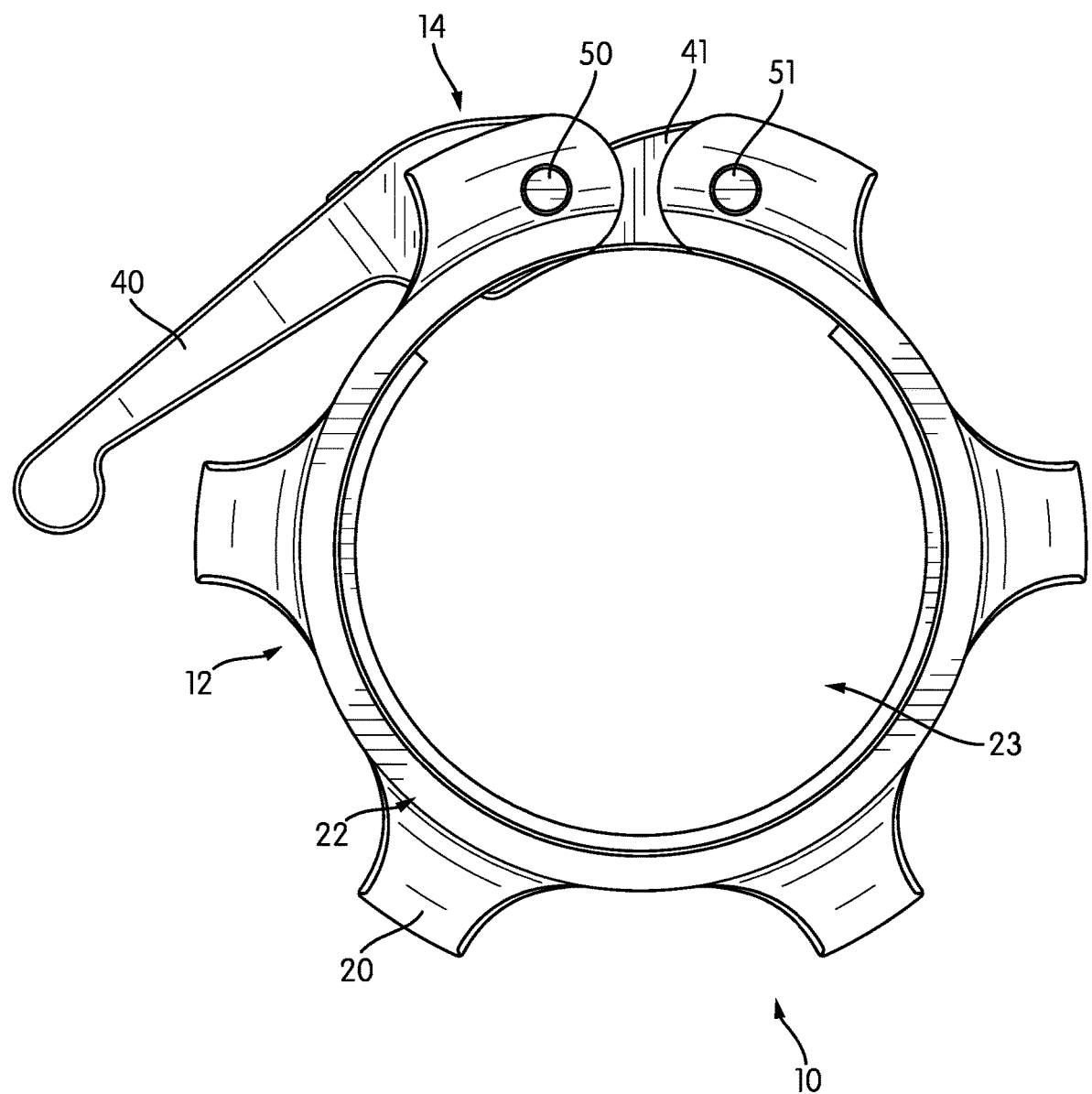
FIG. 4 is a rear view of the clamping device of FIG. 1.
Figure 5:
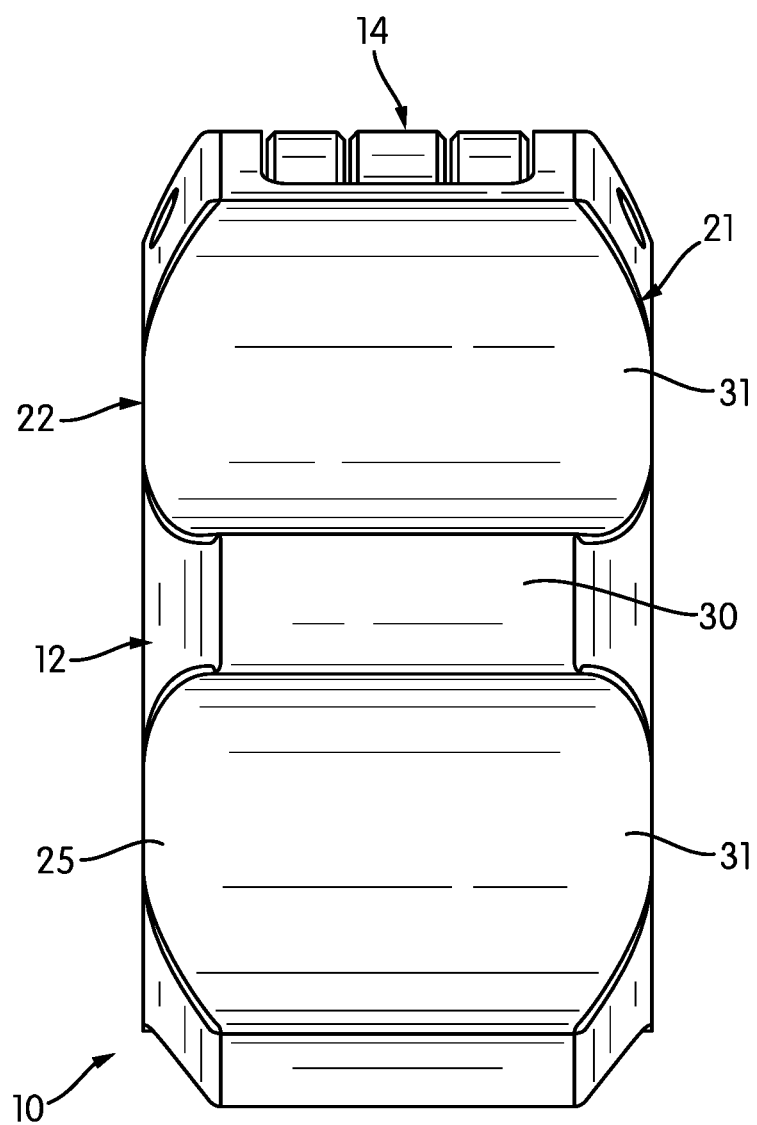
FIG. 5 is a right side view of the clamping device of FIG. 1.
Figure 12:
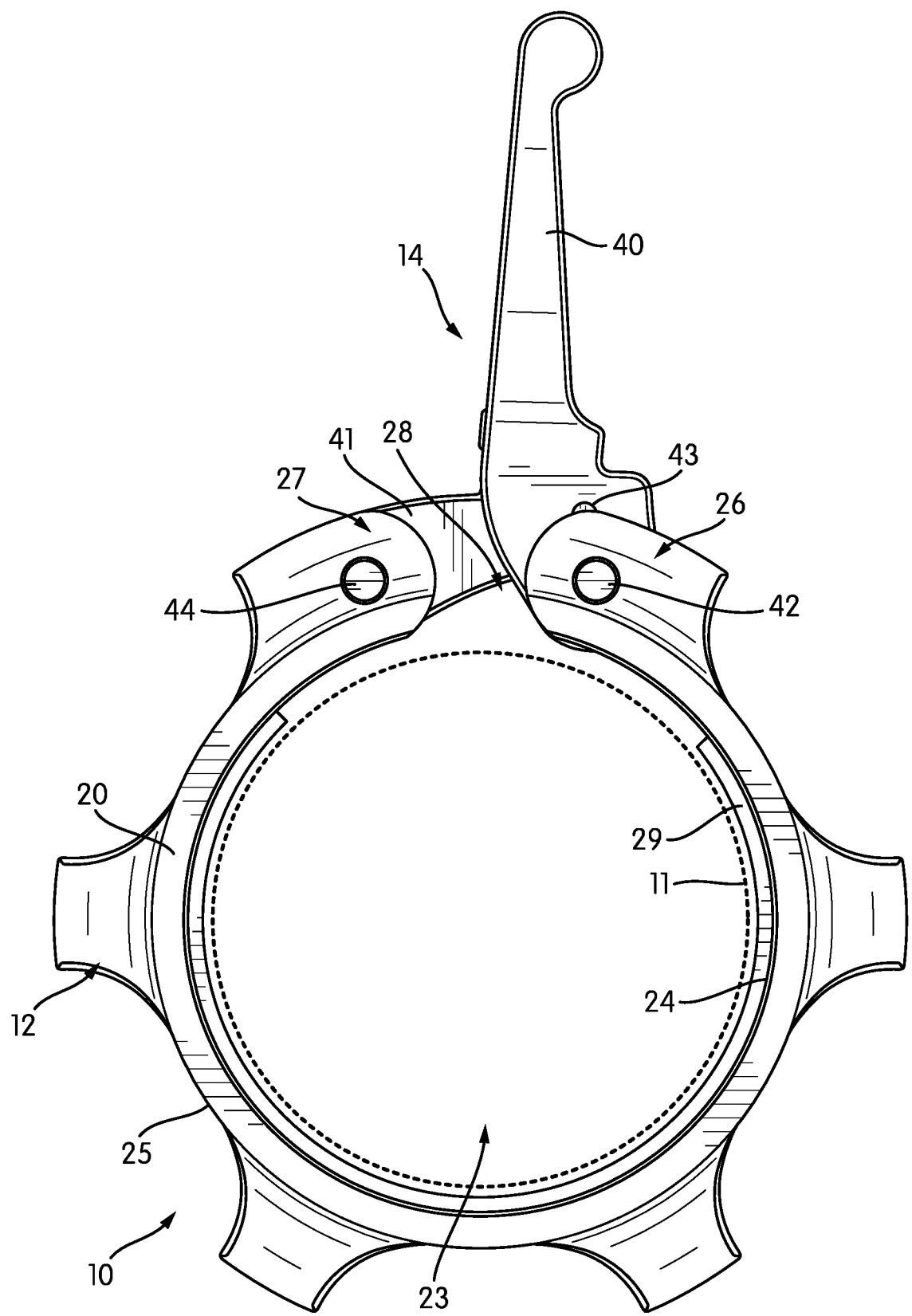
FIG. 12 is a front view of the clamping device of FIG. 10, with broken lines illustrating the mounting member received within the passage of the clamping device.
Figure 13:
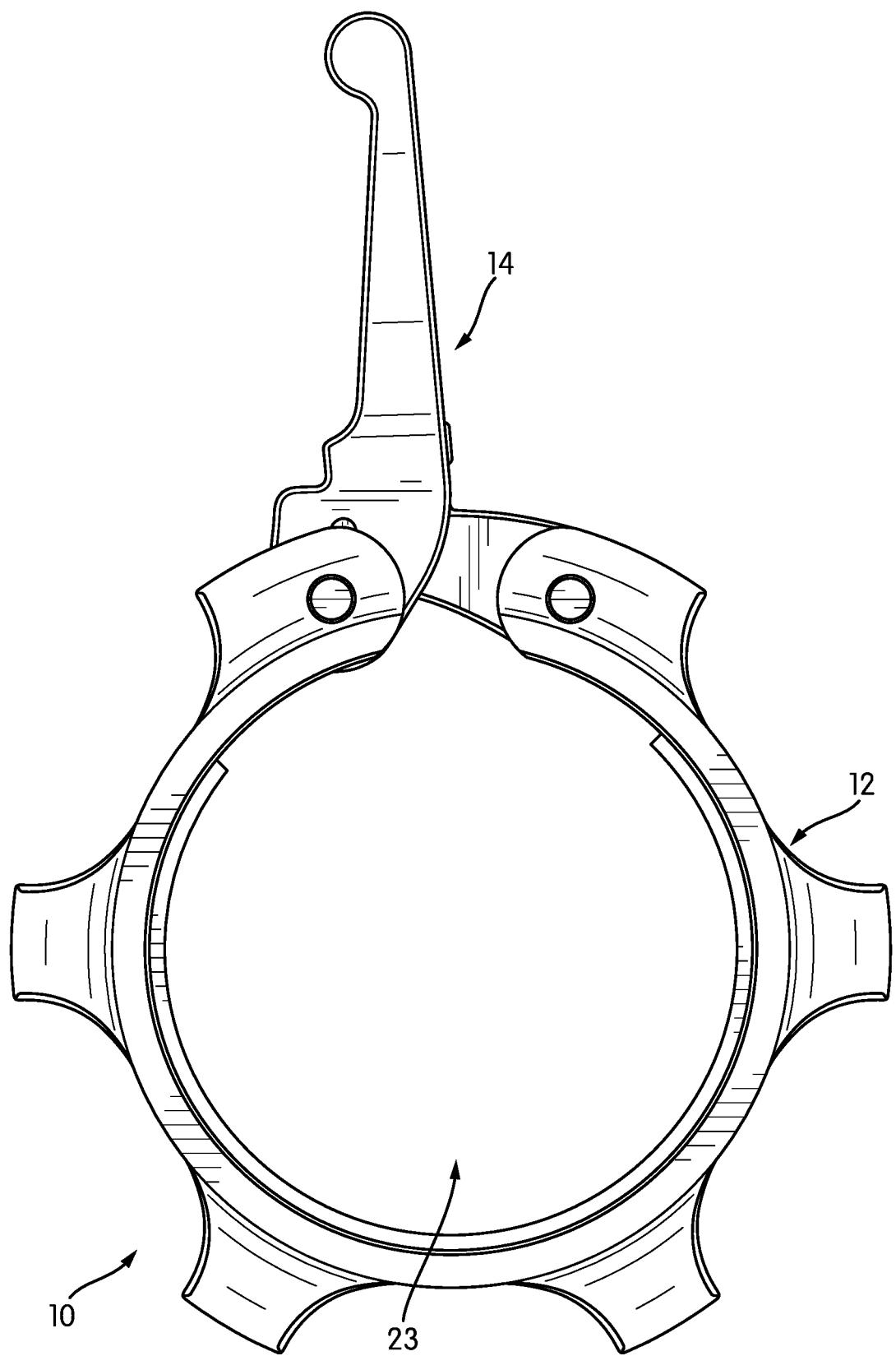
FIG. 13 is a rear view of the clamping device of FIG. 10.
Figure 14:
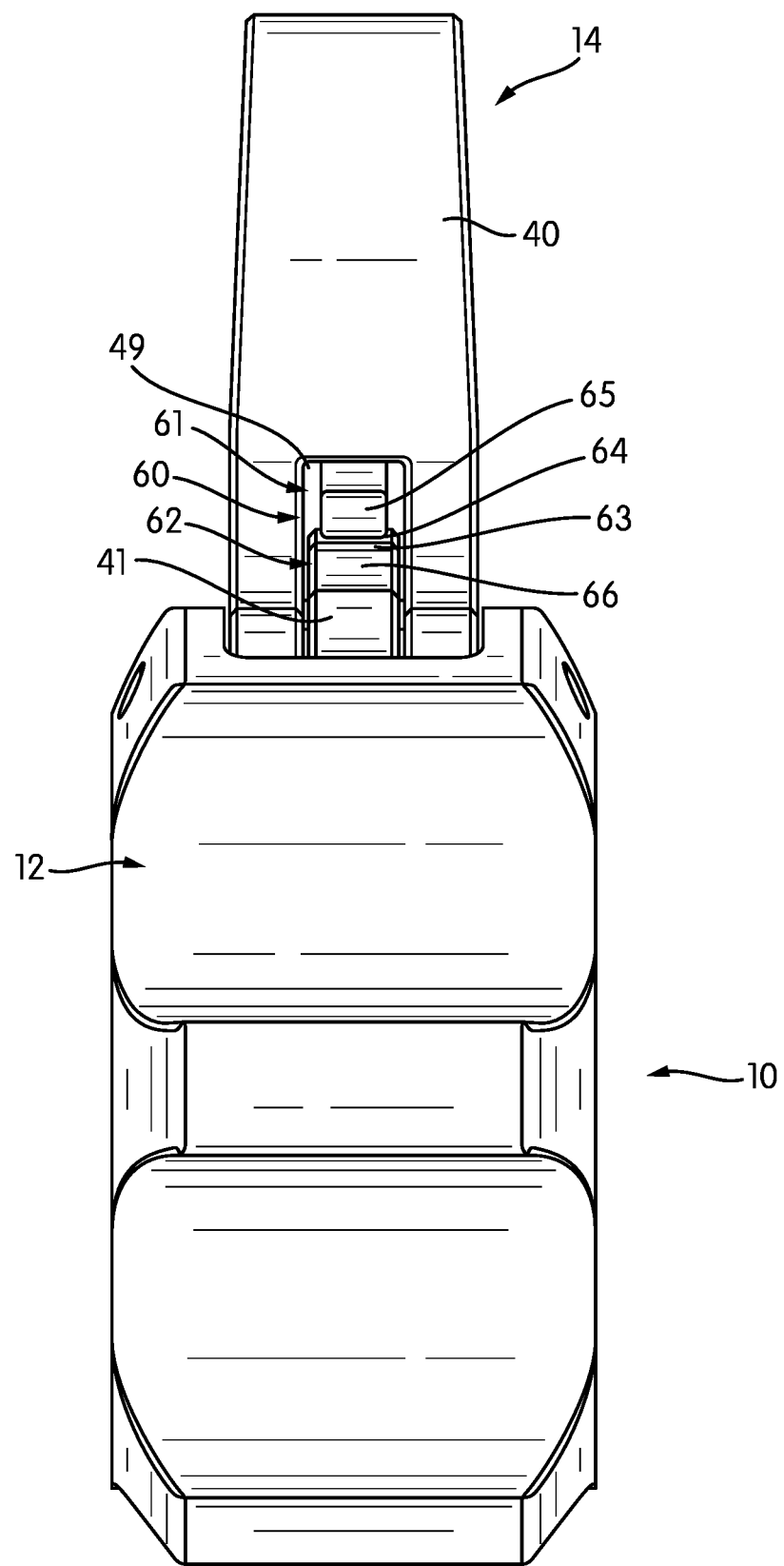
FIG. 14 is a right side view of the clamping device of FIG. 10.
Figure 15:
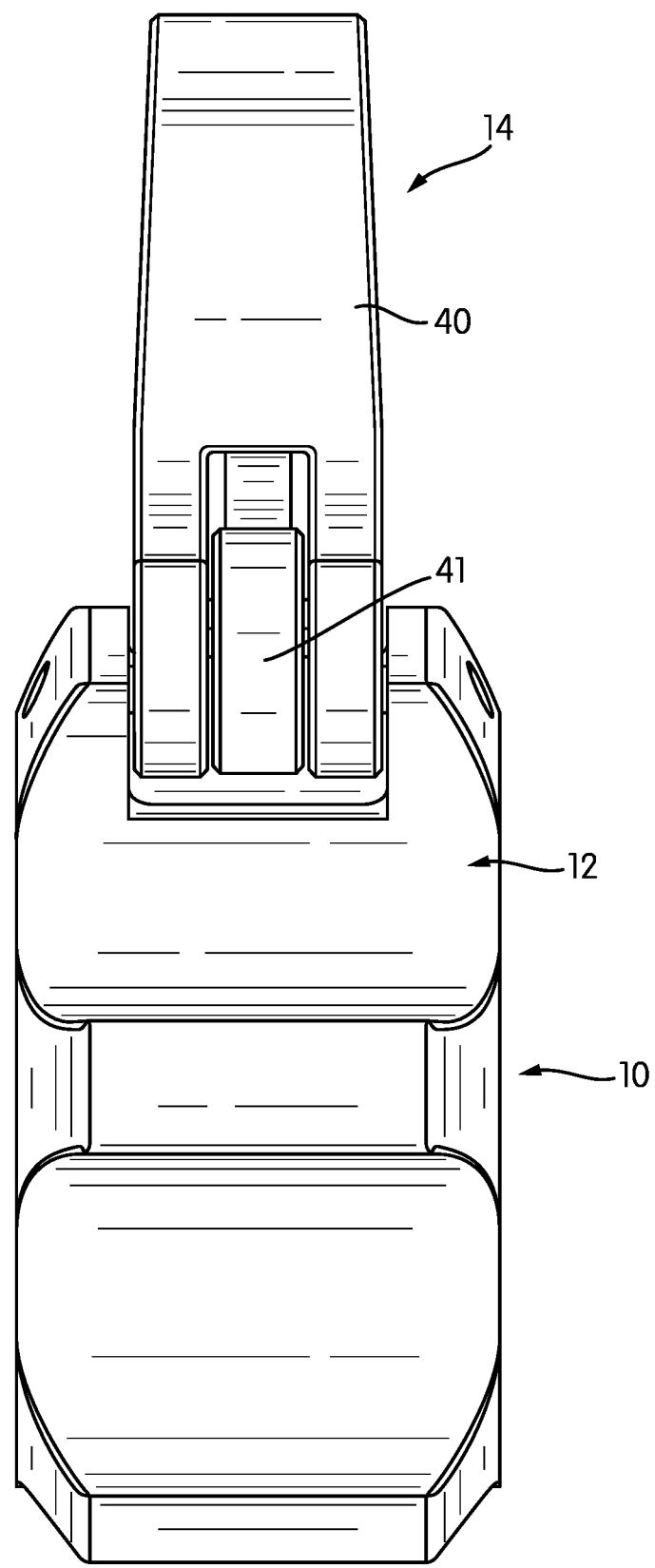
FIG. 15 is a left side view of the clamping device of FIG. 10.
Figure 16:
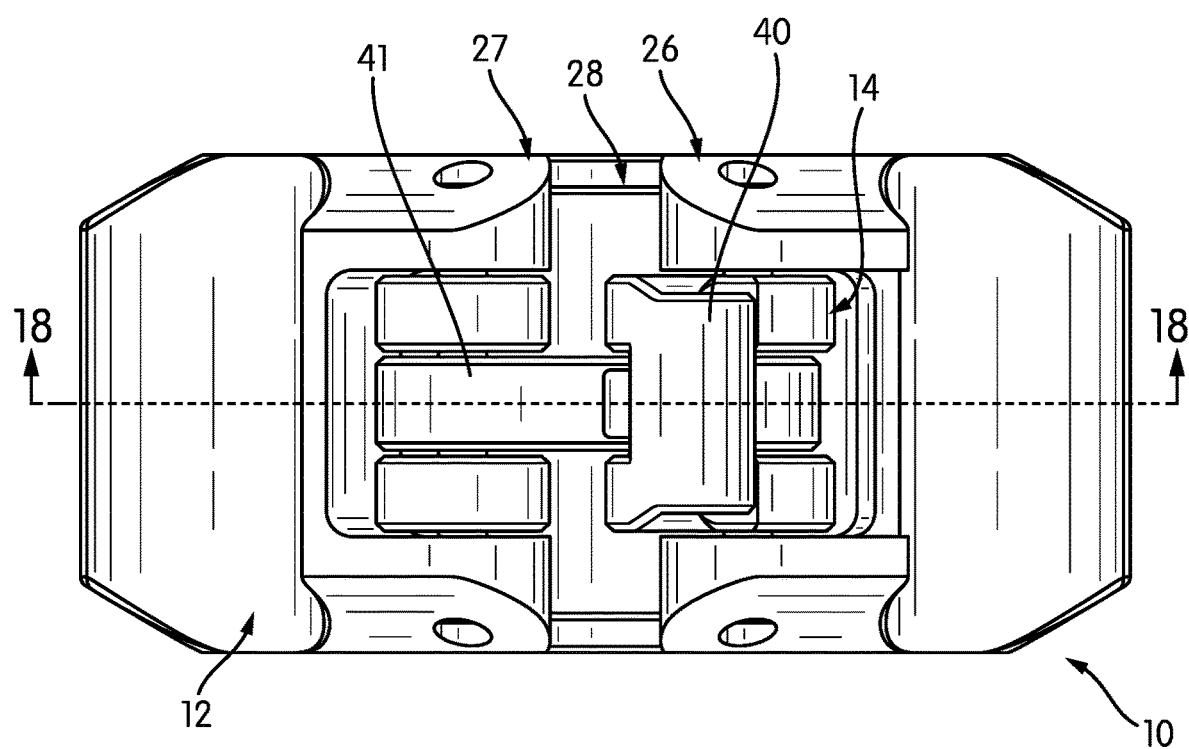
FIG. 16 is a top view of the clamping device of FIG. 10.
Figure 17:
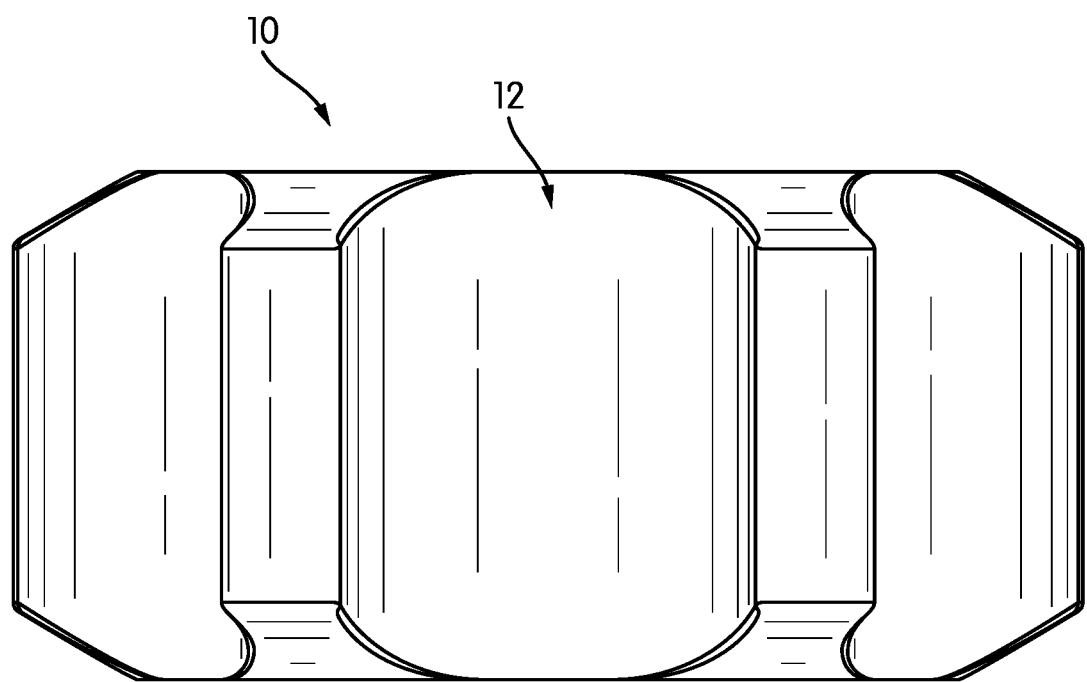
FIG. 17 is a bottom view of the clamping device of FIG. 10.
Figure 21:
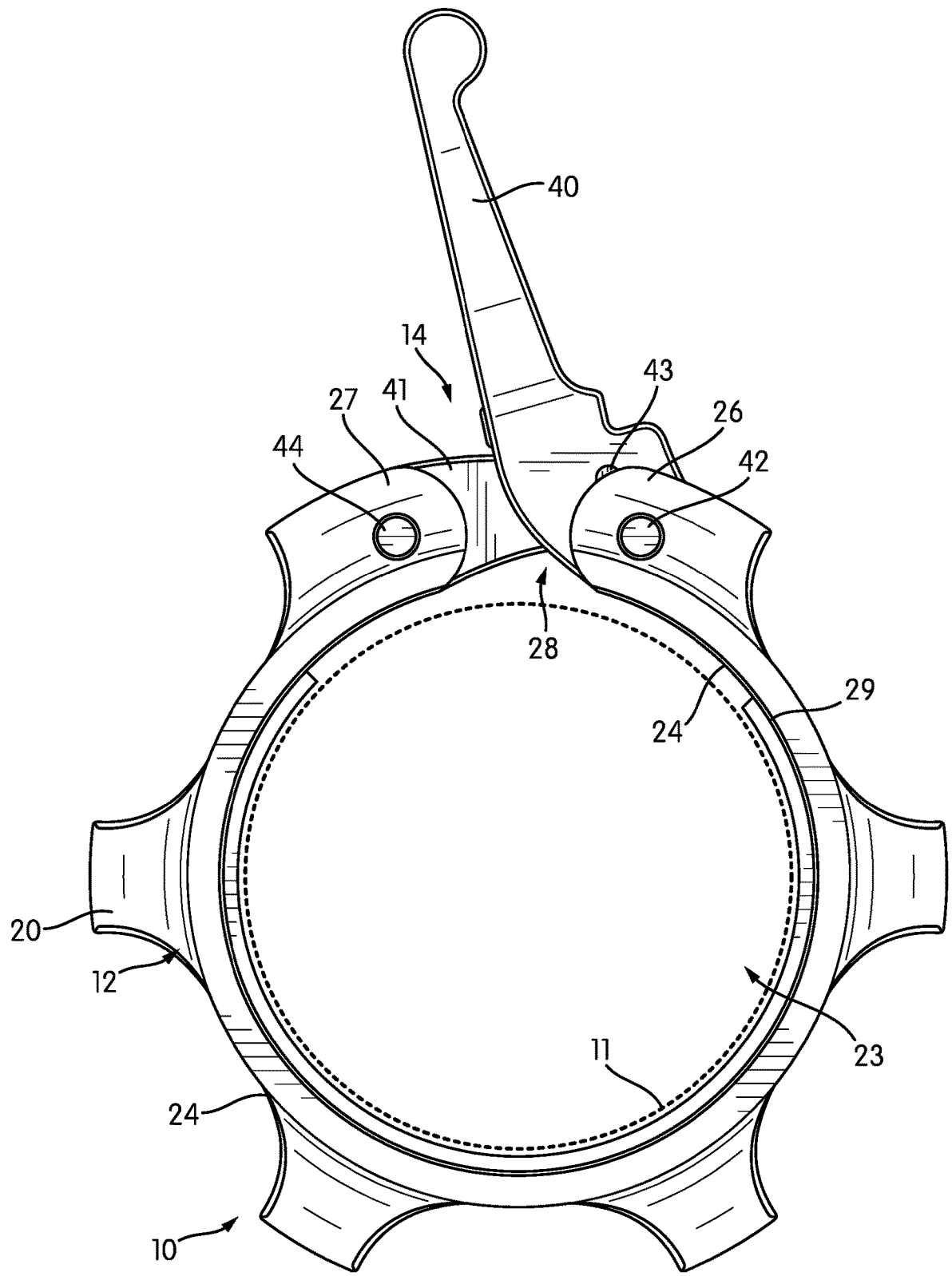
FIG. 21 is a front view of the clamping device of FIG. 19, with broken lines illustrating the mounting member received within the passage of the clamping device.
Figure 22:
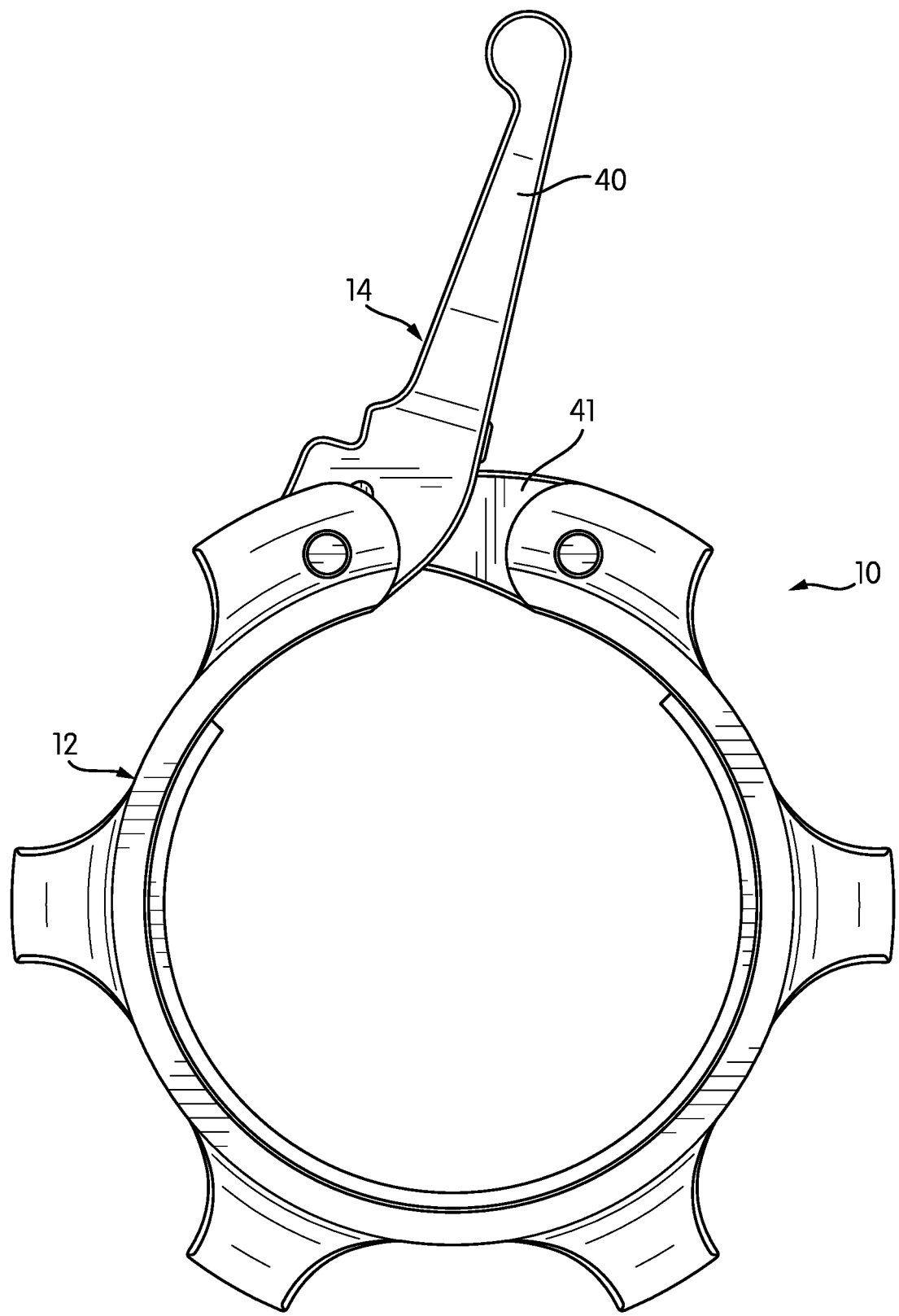
FIG. 22 is a rear view of the clamping device of FIG. 19.
Figure 23:
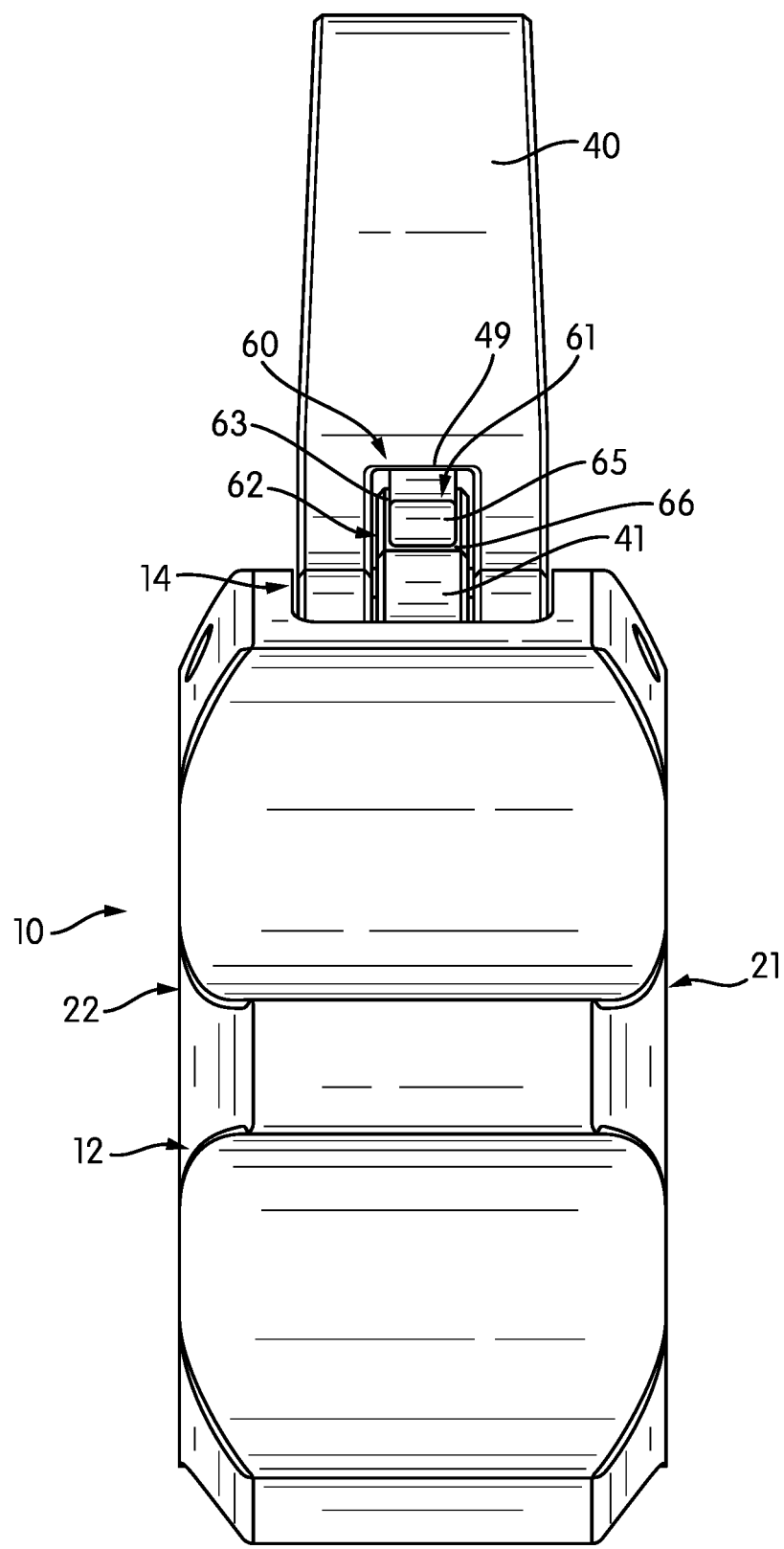
FIG. 23 is a right side view of the clamping device of FIG. 19.
Figure 24:
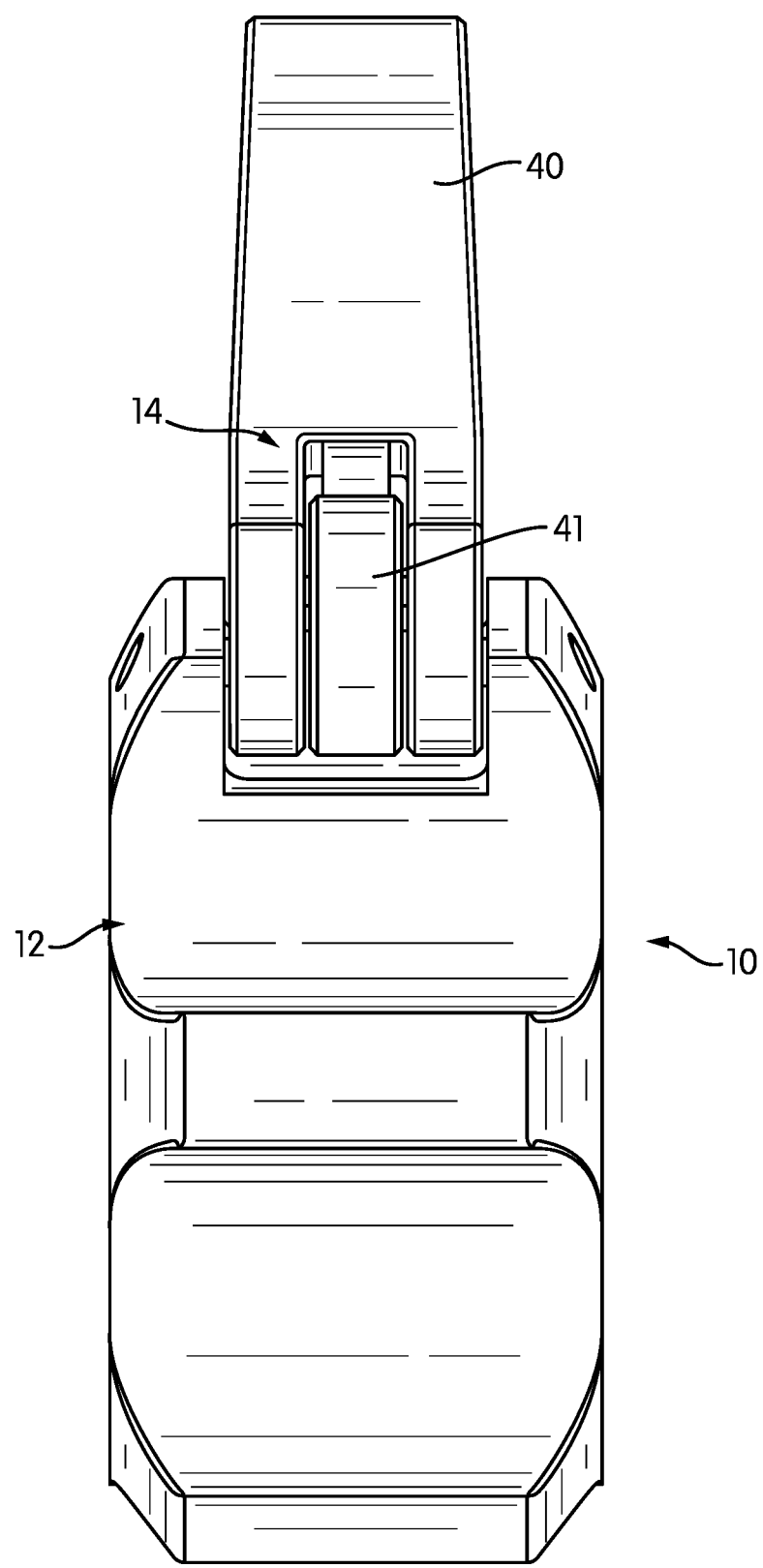
FIG. 24 is a left side view of the clamping device of FIG. 19.
Figure 25:
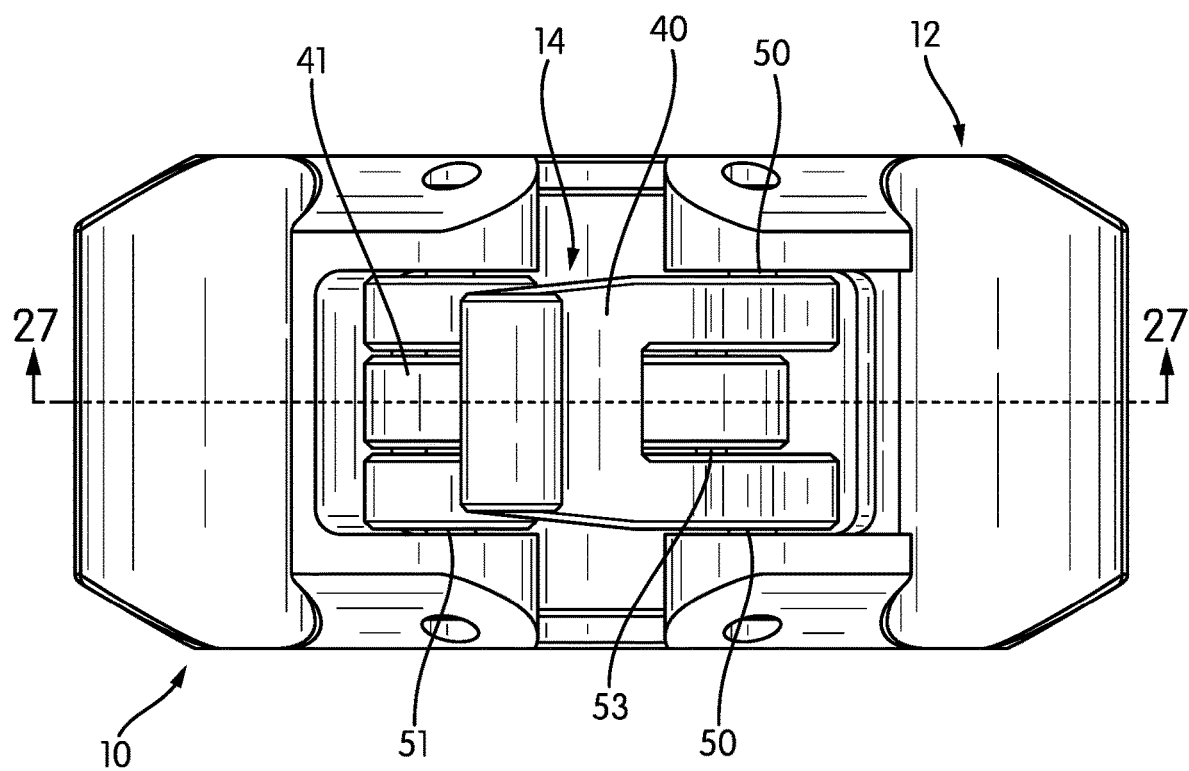
FIG. 25 is a top view of the clamping device of FIG. 19.
Figure 26:
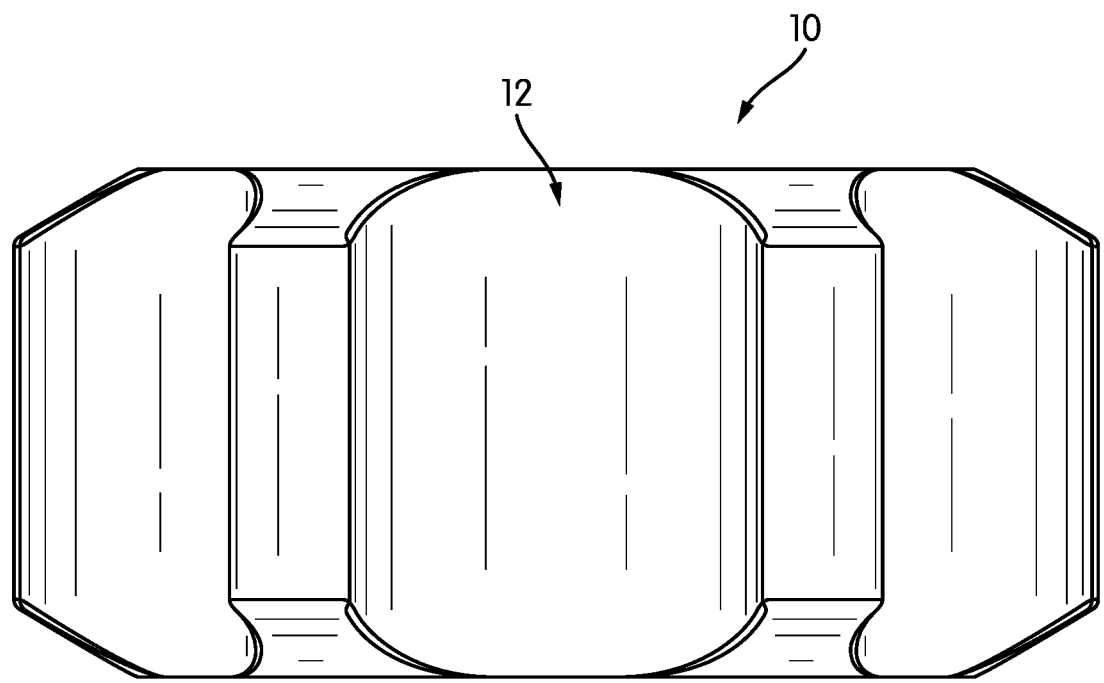
FIG. 26 is a bottom view of the clamping device of FIG. 19.

The actuator mechanism 14 is moveable between at least a locked position, where the primary member 12 is configured to be securely engaged with the mounting member 11, and an unlocked position, where the primary member 12 is configured to not be securely engaged with the mounting member 11 and can be removed from the mounting member 11. In the embodiment of FIGS. 1-27, the movement of the actuator mechanism 14 to the locked position pulls the first and second ends 26, 27 of the primary member 12 closer together, thereby making the gap 28 smaller and decreasing the width (i.e., radius or diameter) of the central passage 23 and causing the inner surface 24 and/or the gripping member 29 to tightly and securely engage the outer surface of the mounting member 11, as shown in FIGS. 3 and 6. Moving the actuator mechanism 14 to the unlocked position moves the first and second ends 26, 27 of the primary member 12 farther apart, thereby making the gap 28 larger and increasing the width of the central passage 23 to a width that is larger than the width of the mounting member 11, as seen in FIGS. 12 and 21. In the unlocked position, the inner surface 24 and/or the gripping member 29 of the primary member 12 do not securely or tightly engage the outer surface of the mounting member 11, as shown in FIG. 12. The cylindrical body 20 has a degree of resilient and/or elastic flexibility, such that the cylindrical body 20 elastically and resiliently flexes when the actuator mechanism 14 pulls the first and second ends 26, 27 of the primary member 12 closer together. When the actuator mechanism 14 is moved toward the unlocked position, the cylindrical body 20 returns to the expanded shape without deformation, and the cylindrical body 20 exerts an expansion force to move the first and second ends 26, 27 apart.

The actuator mechanism 14 includes an actuator 40 in the form of a lever or other pivoting member connected to the primary member 12 proximate the first end 26 and configured to be manipulated by a user, and a pulling member 41 connected to the primary member 12 proximate the second end 27 and configured to pull the first and second ends 26 of the primary member 12 together when the actuator 40 is moved to the locked position. In the embodiment of FIGS. 1-27, the actuator 40 is in the form of a cam lever that has a pivot connection 42 connected to the primary member 12 proximate the first end 26 and an eccentric connection 43 spaced from the pivot connection 42, where the pulling member 41 is connected to the actuator 40 at the eccentric connection 43. The actuator 40 further has a handle 45 extending outward and configured for gripping by a user for manipulation of the actuator 40. In the embodiment of FIGS. 1-27, the eccentric connection 43 is positioned between the pivot connection 42 and the handle 45. The pulling member 41 also has a distal connection 44 spaced from the eccentric connection 43, and the pulling member 41 is connected to the primary member 12 proximate the second end 27 at the distal connection 44, such that the pulling member 41 extends across the gap 28 between the first and second ends 26, 27. In this configuration, the actuator 40 pivots about the pivoting connection 42 in moving between the locked and unlocked positions.

With reference to FIGS. 3, 12, and 21, the actuator 40 pivots clockwise to move from the unlocked position (FIGS. 12 and 21) to the locked position (FIG. 3), and this pivoting causes clockwise revolution of the eccentric connection 43 about the pivot connection 42, pulling the pulling member 41 to the right. This action pulls the first and second ends 26, 27 of the primary member 12 together to narrow the central passage 23 and engage the mounting member 11. Again with reference to FIGS. 3, 12, and 21, the actuator 40 pivots counterclockwise to move from the locked position (FIG. 3) to the unlocked position (FIGS. 12 and 21), and this pivoting causes counterclockwise revolution of the eccentric connection 43 about the pivot connection 42, pushing the pulling member 41 to the left. This action pushes the first and second ends 26, 27 of the primary member 12 apart to widen the central passage 23. Viewed another way, the actuator 40 pivots away from the pulling member 41 and away from the second end 26 of the primary member 12, and the handle 45 rotates toward the outer surface 25 of the primary member 12, when moving from the unlocked position to the locked position, and the reverse is true when moving from the locked position to the unlocked position.

The actuator 40 and the pulling member 41 in FIGS. 1-27 are connected to the first and second ends 26, 27 of the primary member 12 within first and second slots 46, 47 located at the first and second ends 26, 27, respectively. In this configuration, the actuator 40 has two arms 48 with a slot or space 49 therebetween, and the arms 48 are both received in the first slot 46 and connected to pins 50 within the first slot 46 to form the pivot connection 42 within the first slot 46. The pulling member 41 is received in the second slot 47 and is connected to a pin 51 within the second slot 47 to form the distal connection 44 within the second slot 47. The pulling member 41 in FIGS. 1-27 is in the form of a plate member, and the second slot 47 in this embodiment has spacers 52 on either side of the pulling member 41. The pulling member 41 in this configuration is also received within the slot 49 of the actuator 40, between the arms 48, and is connected to one or both of the arms 48 by a pin 53 to form the eccentric connection 43 within the slot 49. The actuator mechanism 14 may have a different structural and/or functional configuration in other embodiments.

Figure 18:
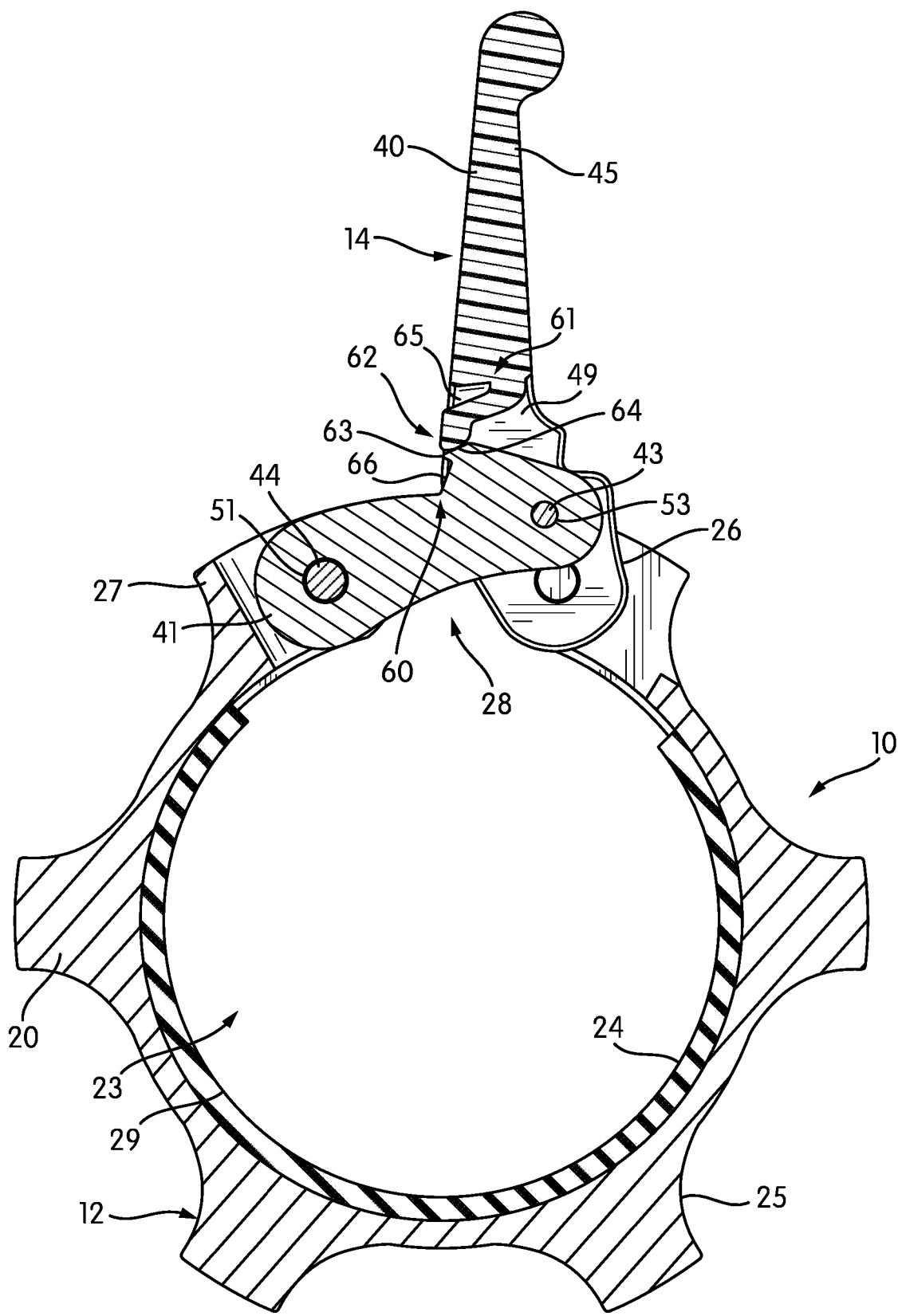
FIG. 18 is a cross-section view of the clamping device of FIG. 10, taken along line 18-18 of FIG. 16.
Figure 19:
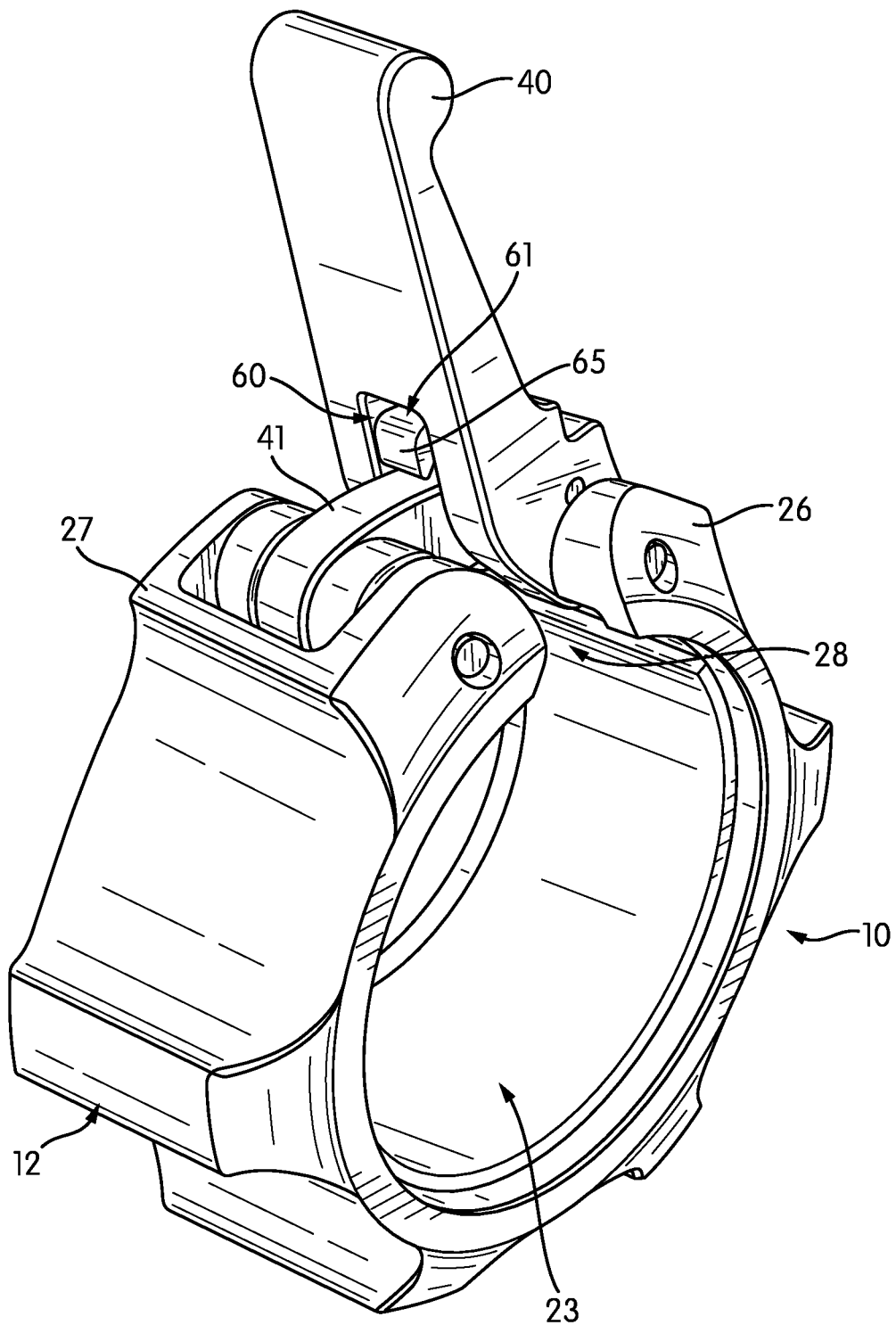
FIG. 19 is a front-right perspective view of the clamping device of FIG. 1, shown in a fully unlocked position or retained position.
Figure 20:
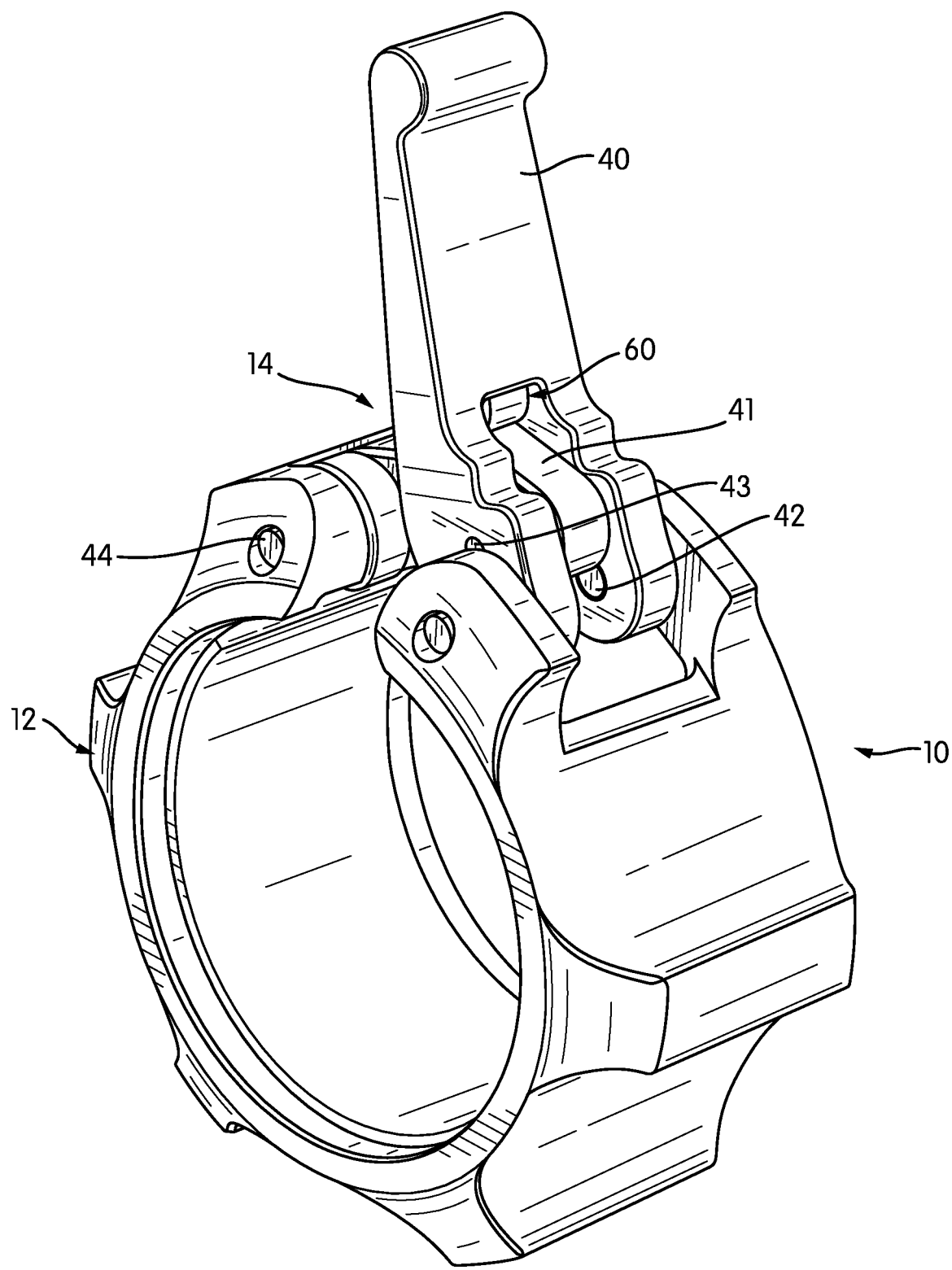
FIG. 20 is a front-left perspective view of the clamping device of FIG. 19.
Figure 27:
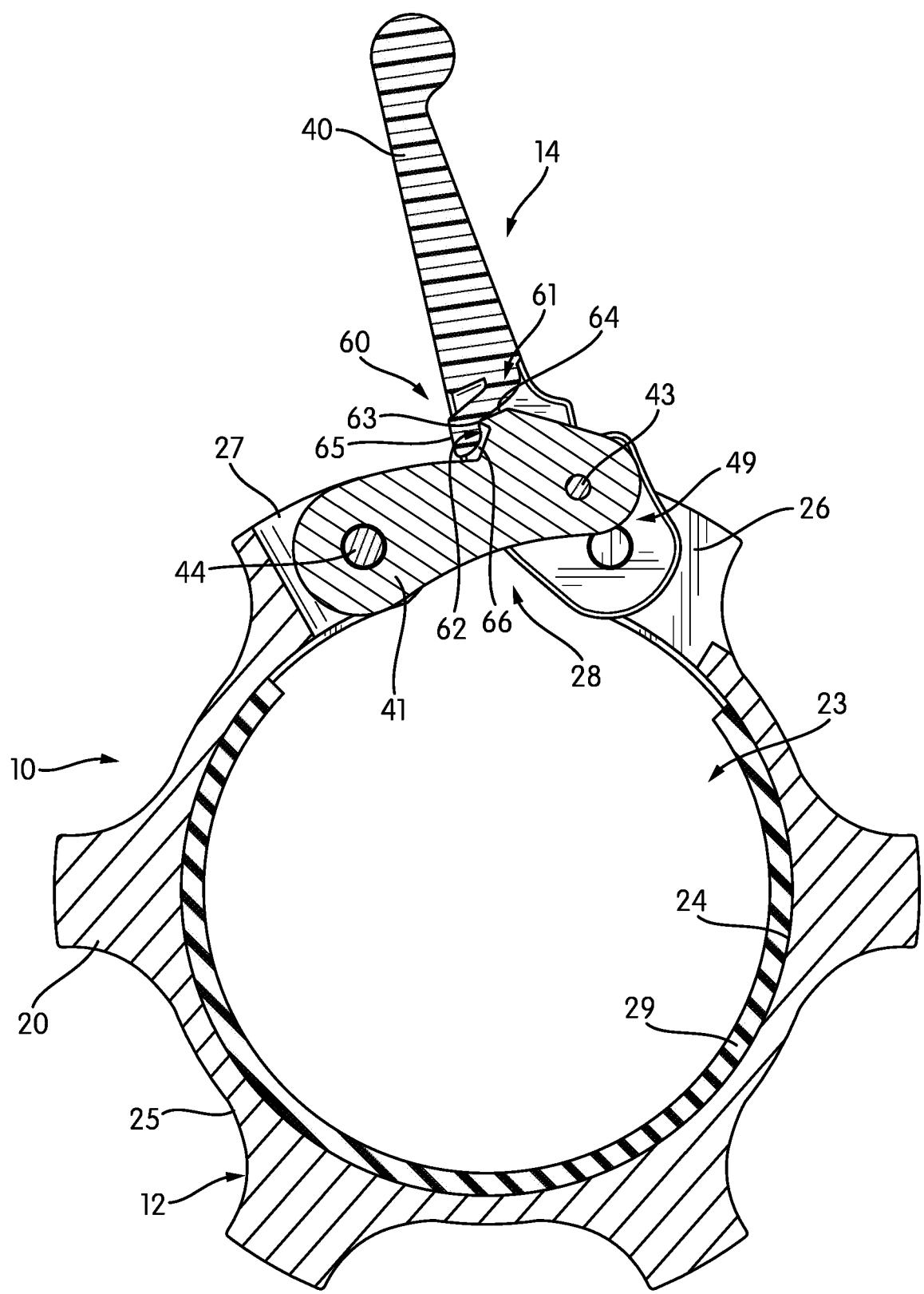
FIG. 27 is a cross-section view of the clamping device of FIG. 19, taken along line 27-27 of FIG. 25.

The actuator mechanism 14 may further include a retaining mechanism 60 configured to releasably retain the actuator 40 in the unlocked position, and the retaining mechanism 60 may operate by cooperative engagement between the actuator 40 and the pulling member 41 in one embodiment. In the embodiment of FIGS. 1-27, the actuator 40 and the pulling member 41 have complementary locking members 61, 62 that are configured to releasably engage each other. In this embodiment, the locking member 62 of the pulling member 41 includes a rigid lip 63 with a ramped or beveled surface 64, and the locking member 61 of the actuator 40 includes a flexible, resilient retaining tab 65 positioned within the slot 49 of the actuator 40. The retaining tab 65 in FIGS. 1-27 is connected to the actuator 40 at the closed end of the slot 49 and extends both longitudinally outward and transverse to the direction of elongation of the actuator 40, leaving space between the retaining tab 65 and the actuator 40 to enable the tab 65 to flex rearward toward the closed end of the slot 49. In one embodiment, the entire actuator 40, including the retaining tab 65, may be formed of a single piece, such as a molded polymer or FRP. As shown in FIG. 18, when the actuator 40 is rotated toward the unlocked position (counterclockwise in FIG. 18), the end of the retaining tab 65 engages the beveled surface 64 and flexes the tab 65 away from the pivot connection 42 and toward the closed end of the slot 49. As shown in FIG. 27, when the actuator 40 has been rotated sufficiently toward the unlocked position (counterclockwise in FIG. 27), the retaining tab 65 slips into a notch 66 below the underside of the lip 63 and engages the lip 63 to resist movement of the actuator 40 toward the locked position (clockwise). The retaining engagement between the retaining tab 65 and the lip 63 occurs at least partially within the slot 49 in this configuration. Movement of the actuator 40 toward the locked position (clockwise in FIGS. 18 and 27) causes the retaining tab 65 to flex against the lip 63, and the actuator 40 cannot be moved to the locked position until sufficient force is exerted on the actuator 40 sufficient to flex the retaining tab 65 and cause the retaining tab 65 to clear the lip 63. In another embodiment, the locations of the lip 63 and the retaining tab 65 may be transposed, such that the lip 63 is located on the actuator 40 and the retaining tab 65 is located on the pulling member 41. Thus, the retaining mechanism 60 in one embodiment may be considered to include a rigid lip 63 on one of the actuator 40 and the pulling member 41 and a flexible, resilient retaining tab on the other of the actuator 40 and the pulling member 41. In other embodiments, the retaining mechanism 60 may be differently configured, including locking members 61, 62 with structurally or functionally different configurations. In a further embodiment, at least one of the locking members 61, 62 may be separate from the actuator 40 or the pulling member 41, respectively, and may be located elsewhere on the actuator mechanism 14 or on a different portion of the clamping device 10.

In one embodiment, the actuator mechanism 14 may have multiple unlocked positions, such that the retaining mechanism 60 may not be immediately engaged when the actuator 40 is moved to the unlocked position, and the actuator 40 may be further moveable to a retained position, where the retaining mechanism 60 is engaged, and the actuator 40 is releasably retained against moving to the locked position. The actuator mechanism 14 in FIGS. 1-27 has an intermediate unlocked position, shown in FIGS. 10-18, where the clamping device 10 may be removed from the mounting member 11 while the retaining mechanism 60 is not engaged, and a fully unlocked position or retained position, shown in FIGS. 19-27, where the retaining mechanism 60 is engaged to resist movement of the actuator 40 to the locked position as described herein. The retaining mechanism 60 may not function to lock or retain the actuator 40 in the intermediate unlocked position. The actuator 40 in this configuration is moved from the locked position to the intermediate unlocked position by movement in a first direction (e.g., counterclockwise rotation in FIGS. 9, 18, and 27), and is moved from the intermediate position to the retained position by further movement in the same direction. Likewise, the actuator 40 can be moved sequentially from the retained and/or fully unlocked position (FIG. 27) to the intermediate unlocked position (FIG. 18) and to the locked position (FIG. 9) by movement in the same direction (e.g., clockwise rotation in FIGS. 9, 18, and 27).

Figure 28:
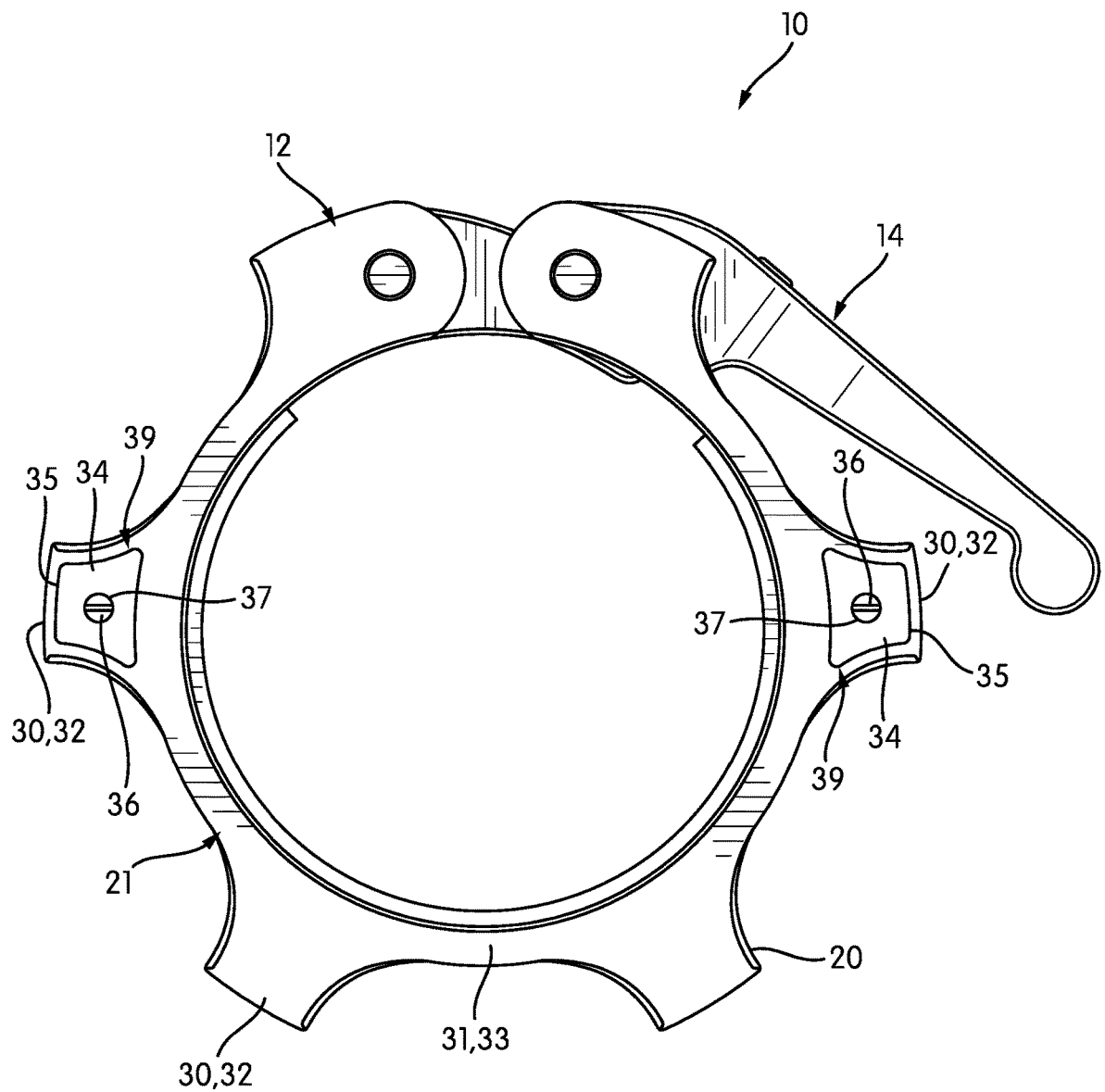
FIG. 28 is a front view of another embodiment of a clamping device according to aspects of the disclosure, shown in a locked position.
Figure 29:
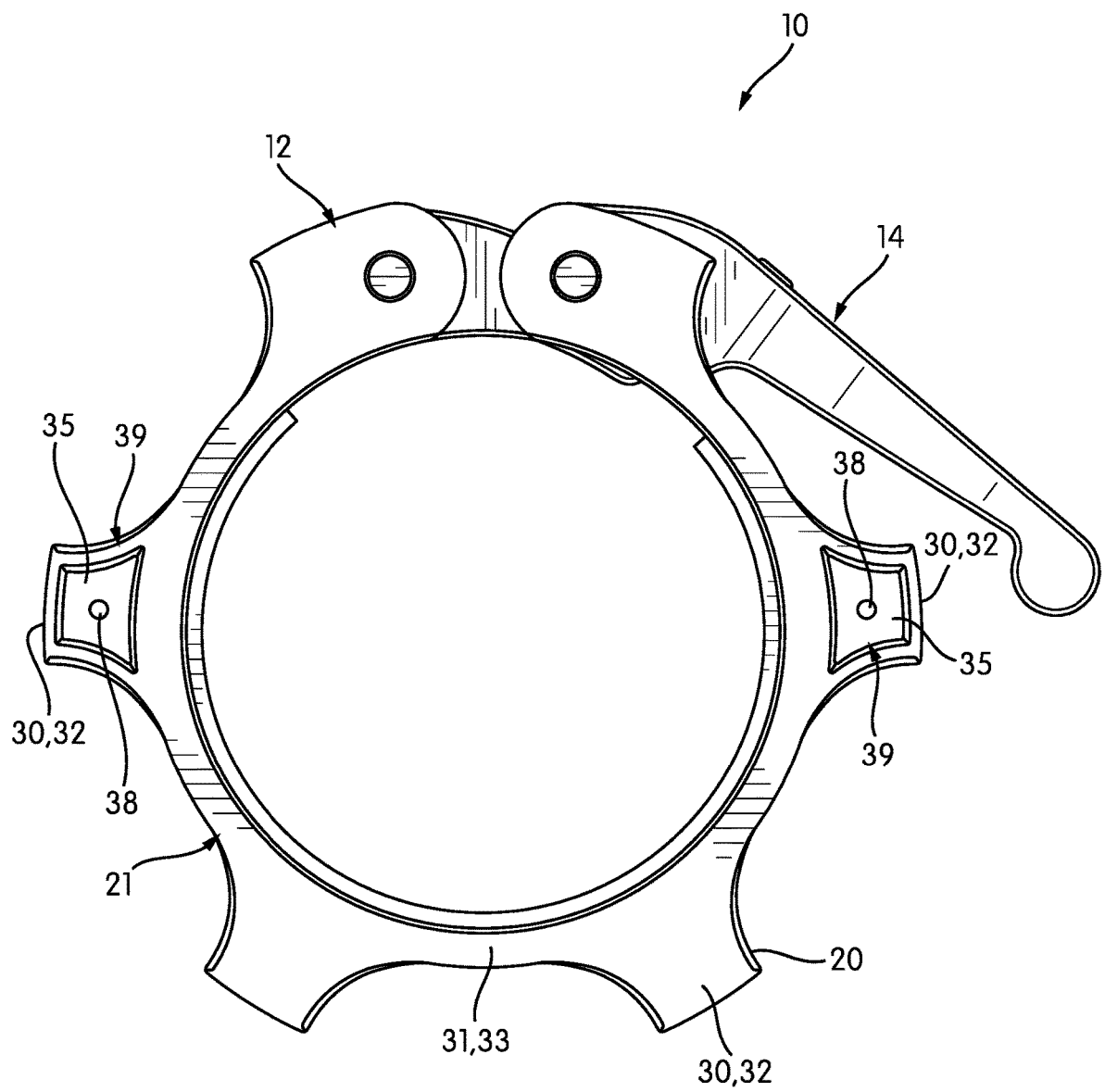
FIG. 29 is a front view of the clamping device of FIG. 28 with weight members removed.
Figure 30:
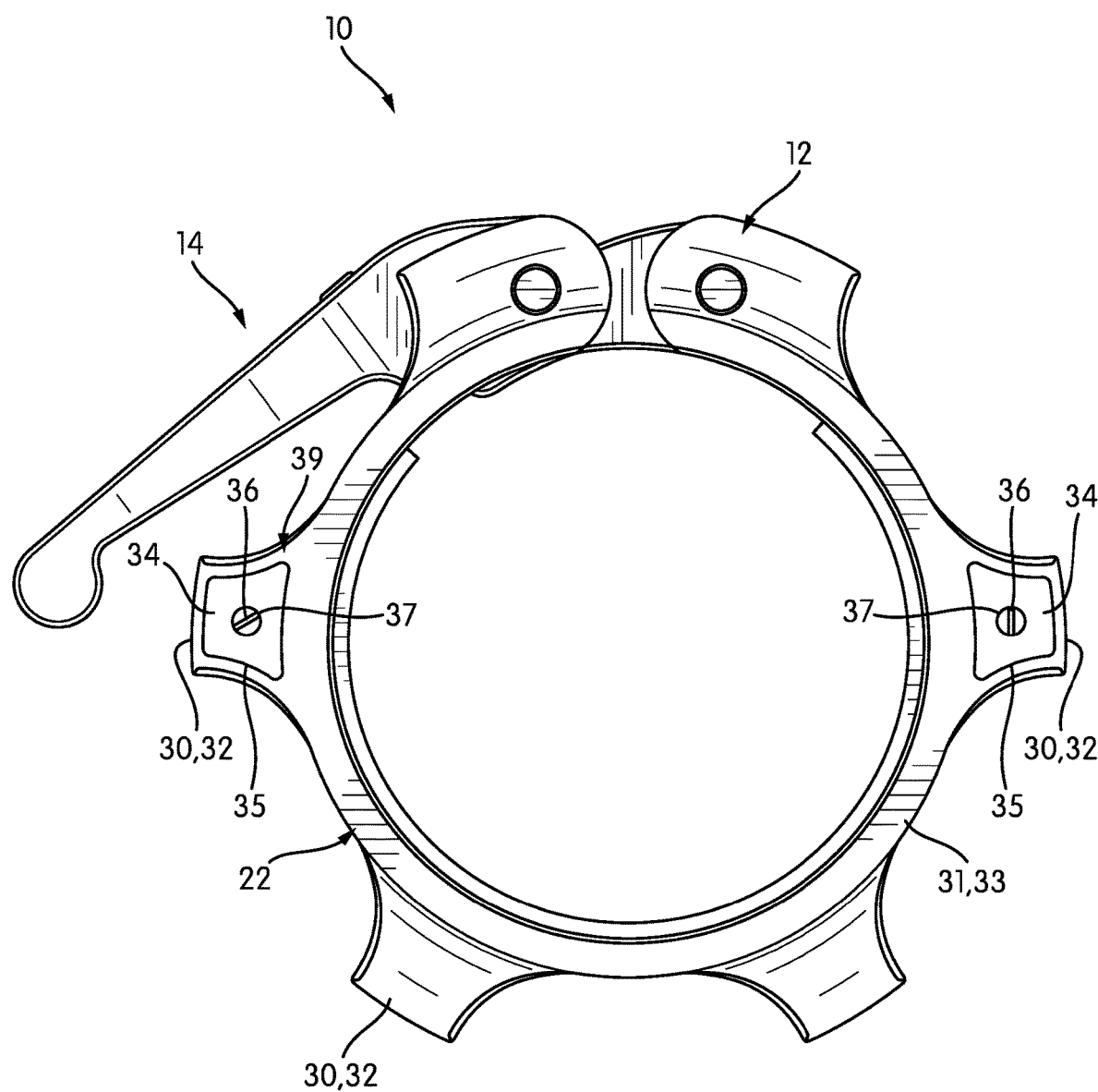
FIG. 30 is a rear view of the clamping device of FIG. 28.

FIGS. 28-30 illustrate another embodiment of a clamping device 10 that has many components and features that are similar or identical to the clamping device of FIGS. 1-27. Such similar or identical components and features are not described again in detail with respect to FIGS. 28-30 for the sake of brevity, and the embodiment of FIGS. 28-30 is described primarily with respect to features that are different from corresponding features in the embodiment of FIGS. 1-27. It is understood that any alternate variations or features described herein with respect to FIGS. 1-27 may be included in the embodiment of FIGS. 28-30, and vice versa. In the embodiment of FIGS. 28-30, the clamping device 10 includes one or more magnetic members 34 connected to the primary member 12, but is otherwise identical to the clamping device 10 of FIGS. 1-27.

The clamping device 10 in one embodiment includes at least one magnetic member 34 connected to the front side 21 of the primary member 12 and at least one magnetic member 34 connected to the rear side 22 of the cylindrical body 20 of the primary member 12. The clamping device 10 may include a plurality of magnetic members 34 on one or both sides 21, 22. In the embodiment of FIGS. 28-30, the clamping device 10 has two magnetic members 34 connected to the primary member 12 at each of the front and rear sides 21, 22. The magnetic members 34 may be removably connected to the clamping device 10 in one embodiment. The magnetic members 34 in FIGS. 28-30 are received within cavities 35 positioned within the cylindrical body 20 of the primary member 12 and are removably connected to the cylindrical body 20 by fasteners 36 (e.g., screws) that are received through holes 37 in the magnetic members 34 and are also received in holes 38 within the cavities 35. The holes 37 in the magnetic members 34 may have a countersunk or beveled region around the openings of the holes 37 to permit the heads of the fasteners 36 to sit therein.

The magnetic members 34 as shown in FIGS. 28 and 30 are approximately the same shape and depth as the cavities 35, such that the magnetic members 34 substantially fill the cavities 35 and the outer surfaces of the magnetic members 34 are substantially flush with the surrounding outer surfaces of the front and rear sides 21, 22 of the cylindrical body 20. The cavities 35 in FIGS. 28-30 are positioned at least partially within the raised portions 30 or the thick portions 32 of the cylindrical body 20, and are positioned on opposite lateral sides of the cylindrical body 20 approximately aligned with a horizontal centerline or center plane of the cylindrical body 20. Additionally, the cavities 35 on the front side 21 in this embodiment are positioned at least partially within the same raised portions 30 or thick portions 32 as the cavities 35 on the rear side 22. The cavities 35 and the magnetic members 34 are substantially trapezoidal in shape in FIGS. 28-30, but may be different shapes in other embodiments. In one embodiment, the cavities 35 and the magnetic members 34 may have non-circular shapes in order to resist rotation of the magnetic members 34 within the cavities 35.

The raised portions 30 or the thick portions 32 of the cylindrical body 20 in the embodiment of FIGS. 28-30 have surfaces 39 at least partially surrounding the cavities 35 that are generally flat on the front and rear sides 21, 22. In this embodiment, the surfaces 39 on the front and rear sides 21, 22 are generally flat and level with the other portions of the cylindrical body 20, including the portions of the front and rear sides 21, 22 located at the recessed portions 31 or the thin portions 33. This is in contrast to the embodiment of FIGS. 1-27, where the raised portions 30 or the thick portions 32 of the cylindrical body 20 have contoured surfaces on the front and rear sides 21, 22 that are axially recessed with respect to the surfaces at the recessed portions 31 or the thin portions 33. The surfaces 39 in FIGS. 28-30 extend axially forward and rearward as far or farther than other surfaces of the front and rear sides 21, 22. In this configuration, if the front or rear side 21, 22 of the cylindrical body 20 is placed against a flat surface, the magnet members 34 will not be prevented from contacting the surface by other portions of the cylindrical body 20 extend farther axially outward. The side surfaces of the other raised portions 30 or thick portions 32 of the cylindrical body 20 (i.e., not including cavities 35) may also be generally flat and configured similarly to the surfaces 39 surrounding the cavities 35.

The magnetic members 34 in FIGS. 28-30 are configured for mounting the clamping device 10 in a storage position by simply placing either side 21, 22 of the clamping device 10 in contact with a metal structure, such as a support beam or cross-bar of a weight rack (not shown) or other metal structure, including structures that are partially made of metal. The magnetic members 34 have powerful enough magnetic properties to releasably stick to the metal structure. This may be useful, for example, for placing the clamping device 10 in an easily accessible position when changing or adding weights on a barbell that is being supported and/or used with a weight rack or other metal structure. It is understood that other structural, functional, and/or ornamental members may be received in the cavities 35 and connected in the same manner, and such other members may be interchangeable with the magnetic members 34.

Various embodiments of clamping devices have been described herein, which include various components and features. In other embodiments, the clamping device may be provided with any combination of such components and features. It is also understood that in other embodiments, the various devices, components, and features of the clamping device described herein may be constructed with similar structural and functional elements having different configurations, including different ornamental appearances.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Terms such as "top," "bottom," "front," "side," "rear," "proximal," "distal," and the like, as used herein, are intended for illustrative purposes only and do not limit the embodiments in any way. Nothing in this specification should be construed as requiring a specific three dimensional orientation of structures in order to fall within the scope of this invention, unless explicitly specified by the claims. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A clamping device comprising:
a primary member comprising a cylindrical body extending between first and second ends and having a passage configured to receive a mounting member therethrough;
an actuator mechanism configured to move the primary member to securely engage the mounting member, the actuator mechanism comprising an actuator connected to the primary member at a pivot connection and a pulling member connected to the primary member at a distal connection and connected to the actuator at an eccentric connection offset from the pivot connection, wherein the actuator is moveable between a locked position, where the primary member is configured to securely engage the mounting member, and an unlocked position, where the primary member is removable from the mounting member, and wherein movement of the actuator from the unlocked position to the locked position is configured to move the pulling member to pull the first and second ends of the primary member closer together to cause the primary member to securely engage the mounting member; and
a retaining mechanism comprising complementary locking members on the actuator and the pulling member configured to engage each other to releasably retain the actuator in the unlocked position such that the retaining mechanism is configured to resist movement of the actuator in the unlocked position.

2. The clamping device of claim 1, wherein the actuator comprises first and second arms pivotably connected to the primary member at the pivot connection and a handle extending outwardly from the first and second arms, with a slot defined between the first and second arms, and wherein the pulling member is received within the slot and the eccentric connection connects the pulling member to the first and second arms.

3. The clamping device of claim 1, wherein the actuator is further moveable to an intermediate unlocked position rotationally between the locked position and the unlocked position, wherein when the actuator is in the intermediate unlocked position, the primary member is removable from the mounting member and the complementary locking members do not retain the actuator in the intermediate unlocked position.

4. The clamping device of claim 1, wherein the cylindrical body has an inner surface defining the passage, and the clamping device further comprises a gripping member connected to the inner surface of the cylindrical body and extending around a portion of the passage, the gripping member configured to engage the mounting member when the mounting member is received in the passage.

5. The clamping device of claim 1, wherein the cylindrical body is formed of a single, integral piece of a metallic material.

6. A clamping device comprising:
a primary member comprising a cylindrical body extending between first and second ends and having a passage configured to receive a mounting member therethrough;
an actuator mechanism configured to move the primary member to securely engage the mounting member, the actuator mechanism comprising an actuator connected to the primary member at a pivot connection and a pulling member connected to the primary member at a distal connection and connected to the actuator at an eccentric connection offset from the pivot connection, wherein the actuator is moveable between a locked position, where the primary member is configured to securely engage the mounting member, and an unlocked position, where the primary member is removable from the mounting member, and wherein movement of the actuator from the unlocked position to the locked position is configured to move the pulling member to pull the first and second ends of the primary member closer together to cause the primary member to securely engage the mounting member; and
a retaining mechanism comprising complementary locking members on the actuator and the pulling member configured to engage each other to releasably retain the actuator in the unlocked position,
wherein the actuator comprises first and second arms pivotably connected to the primary member at the pivot connection and a handle extending outwardly from the first and second arms, with a slot defined between the first and second arms, and wherein the pulling member is received within the slot and the eccentric connection connects the pulling member to the first and second arms, and
wherein the locking member of the actuator comprises a flexible tab located within the slot, and the locking member of the pulling member comprises a rigid lip configured to engage the flexible tab.

7. A clamping device comprising:
a primary member comprising a cylindrical body extending between first and second ends and having a passage configured to receive a mounting member therethrough;
an actuator mechanism configured to move the primary member to securely engage the mounting member, the actuator mechanism comprising an actuator connected to the primary member at a pivot connection and a pulling member connected to the primary member at a distal connection and connected to the actuator at an eccentric connection offset from the pivot connection, wherein the actuator is moveable between a locked position, where the primary member is configured to securely engage the mounting member, and an unlocked position, where the primary member is removable from the mounting member, and wherein movement of the actuator from the unlocked position to the locked position is configured to move the pulling member to pull the first and second ends of the primary member closer together to cause the primary member to securely engage the mounting member; and
a retaining mechanism comprising complementary locking members on the actuator and the pulling member configured to engage each other to releasably retain the actuator in the unlocked position,
wherein the actuator comprises first and second arms pivotably connected to the primary member at the pivot connection and a handle extending outwardly from the first and second arms, with a slot defined between the first and second arms, and wherein the pulling member is received within the slot and the eccentric connection connects the pulling member to the first and second arms, and
wherein the first end of the cylindrical body has a first slot and the second end of the cylindrical body has a second slot, wherein the pivot connection connects the actuator to the primary member at the first end such that a portion of the actuator is received in the first slot, and the distal connection connects the pulling member to the primary member at the second end such that a portion of the pulling member is received in the second slot.

8. A clamping device comprising:
a primary member comprising a cylindrical body extending between first and second ends and having a passage configured to receive a mounting member therethrough;
an actuator mechanism configured to move the primary member to securely engage the mounting member, the actuator mechanism comprising an actuator connected to the primary member at a pivot connection and a pulling member connected to the primary member at a distal connection and connected to the actuator at an eccentric connection offset from the pivot connection, wherein the actuator is moveable between a locked position, where the primary member is configured to securely engage the mounting member, and an unlocked position, where the primary member is removable from the mounting member, and wherein movement of the actuator from the unlocked position to the locked position is configured to move the pulling member to pull the first and second ends of the primary member closer together to cause the primary member to securely engage the mounting member; and
a retaining mechanism comprising complementary locking members on the actuator and the pulling member configured to engage each other to releasably retain the actuator in the unlocked position,
wherein the first end of the cylindrical body has a first slot and the second end of the cylindrical body has a second slot, wherein the pivot connection connects the actuator to the primary member at the first end such that a portion of the actuator is received in the first slot, and the distal connection connects the pulling member to the primary member at the second end such that a portion of the pulling member is received in the second slot.

9. A clamping device comprising:
a primary member comprising a cylindrical body extending between first and second ends and having a passage configured to receive a mounting member therethrough;
an actuator mechanism configured to move the primary member to securely engage the mounting member, the actuator mechanism comprising an actuator connected to the primary member at a pivot connection and a pulling member connected to the primary member at a distal connection and connected to the actuator at an eccentric connection offset from the pivot connection, wherein the actuator is moveable between a locked position, where the primary member is configured to securely engage the mounting member, and an unlocked position, where the primary member is removable from the mounting member, and wherein movement of the actuator from the unlocked position to the locked position is configured to move the pulling member to pull the first and second ends of the primary member closer together to cause the primary member to securely engage the mounting member; and a retaining mechanism comprising complementary locking members on the actuator and the pulling member configured to engage each other to releasably retain the actuator in the unlocked position, wherein the complementary locking members comprise a rigid lip on one of the actuator and the pulling member and a flexible retaining tab on the other of the actuator and the pulling member, wherein the flexible retaining tab is configured to engage the rigid lip to releasably retain the actuator in the unlocked position.

10. A clamping device comprising:

a primary member comprising a cylindrical body extending between first and second ends and having a passage configured to receive a mounting member therethrough;

an actuator mechanism configured to move the primary member to securely engage the mounting member, the actuator mechanism comprising an actuator engaged with the primary member that is moveable between a locked position, where the primary member is configured to securely engage the mounting member, and an unlocked position, where the primary member is removable from the mounting member, and wherein movement of the actuator from the unlocked position to the locked position is configured to cause the actuator mechanism to move the first and second ends of the primary member closer together to cause the primary member to securely engage the mounting member; and a retaining mechanism configured to releasably retain the actuator in the unlocked position, the retaining mechanism comprising a retaining tab on the actuator and a complementary retaining member configured to engage the retaining tab to releasably retain the actuator in the unlocked position such that the retaining mechanism is configured to resist movement of the actuator in the unlocked position.

11. The clamping device of claim 10, wherein the actuator is connected to the first end of the cylindrical body, and the actuator mechanism further comprises a pulling member connected to the actuator and connected to the second end of the cylindrical body, such that movement of the actuator from the unlocked position to the locked position is configured to pull the pulling member to pull the first and second ends together and decrease a width of the passage, and movement of the actuator from the locked position to the unlocked position is configured to move the first and second ends apart and increase the width of the passage.

12. The clamping device of claim 10, wherein the actuator is further moveable to an intermediate unlocked position rotationally between the locked position and the unlocked position, wherein when the actuator is in the intermediate unlocked position, the primary member is removable from the mounting member and the retaining mechanism does not retain the actuator in the intermediate unlocked position.

13. The clamping device of claim 10, wherein the cylindrical body has an inner surface defining the passage, and the clamping device further comprises a gripping member connected to the inner surface of the cylindrical body and extending around a portion of the passage, the gripping member configured to engage the mounting member when the mounting member is received in the passage.

14. The clamping device of claim 10, wherein the actuator and the retaining tab are formed as a single molded piece.

15. The clamping device of claim 10, wherein the actuator is elongated, and the retaining tab extends both longitudinally outward and transverse to a direction of elongation of the actuator, and wherein the retaining tab is flexible and is configured to engage the complementary retaining member and flex toward the actuator when the actuator is moved from the locked position to the unlocked position.

16. A clamping device comprising:

a primary member comprising a cylindrical body extending between first and second ends and having a passage configured to receive a mounting member therethrough;

an actuator mechanism configured to move the primary member to securely engage the mounting member, the actuator mechanism comprising an actuator engaged with the primary member that is moveable between a locked position, where the primary member is configured to securely engage the mounting member, and an unlocked position, where the primary member is removable from the mounting member, and wherein movement of the actuator from the unlocked position to the locked position is configured to cause the actuator mechanism to move the first and second ends of the primary member closer together to cause the primary member to securely engage the mounting member; and a retaining mechanism configured to releasably retain the actuator in the unlocked position, the retaining mechanism comprising a retaining tab on the actuator and a complementary retaining member configured to engage the retaining tab to releasably retain the actuator in the unlocked position, wherein the actuator is connected to the first end of the cylindrical body, and the actuator mechanism further comprises a pulling member connected to the actuator and connected to the second end of the cylindrical body, such that movement of the actuator from the unlocked position to the locked position is configured to pull the pulling member to pull the first and second ends together and decrease a width of the passage, and movement of the actuator from the locked position to the unlocked position is configured to move the first and second ends apart and increase the width of the passage, and wherein the first end of the cylindrical body has a first slot and the second end of the cylindrical body has a second slot, wherein a portion of the actuator is received in the first slot, and a portion of the pulling member is received in the second slot.

17. The clamping device of claim 16, wherein the actuator comprises first and second arms pivotably connected to the primary member, with a slot defined between the first and second arms, and a handle extending outwardly from the first and second arms, wherein a second portion of the pulling member is received in the slot between the first and second arms of the actuator.

18. A clamping device comprising:
- a primary member comprising a cylindrical body having a passage configured to receive a mounting member therethrough;
- an actuator mechanism configured to move the primary member to securely engage the mounting member, the actuator mechanism comprising an actuator engaged with the primary member that is moveable between a locked position, where the clamping device is configured to securely engage the mounting member, and an unlocked position, where the clamping device is removable from the mounting member, wherein movement of the actuator from the unlocked position to the locked position is configured to cause the actuator mechanism to move the primary member to securely engage the mounting member, and wherein the actuator comprises first and second arms pivotably connected to the primary member, with a slot defined between the first and second arms, and a handle extending outwardly from the first and second arms; and
- a retaining mechanism configured to releasably retain the actuator in the unlocked position, wherein the retaining mechanism comprises a flexible retaining tab extending outward from the actuator and positioned within the slot between the first and second arms, wherein the flexible retaining tab is configured to engage a complementary retaining member to releasably retain the actuator in the unlocked position such that the retaining mechanism is configured to resist movement of the actuator in the unlocked position.

19. The clamping device of claim 18, wherein the cylindrical body has a first end and a second end spaced from the first end to define a gap, wherein the actuator is connected to the first end and the actuator mechanism further comprises a pulling member connected to the actuator and connected to the second end, such that movement of the actuator from the unlocked position to the locked position is configured to pull the pulling member to pull the first and second ends together and decrease a width of the passage, and movement of the actuator from the locked position to the unlocked position is configured to move the first and second ends apart and increase the width of the passage.

20. The clamping device of claim 19, wherein a portion of the pulling member is received in the slot between the first and second arms of the actuator.

21. The clamping device of claim 18, wherein the actuator is further moveable to an intermediate unlocked position rotationally between the locked position and the unlocked position, wherein when the actuator is in the intermediate unlocked position, the primary member is removable from the mounting member and the retaining mechanism does not retain the actuator in the intermediate unlocked position.

22. The clamping device of claim 18, wherein the cylindrical body has an inner surface defining the passage, and the clamping device further comprises a gripping member connected to the inner surface of the cylindrical body and extending around a portion of the passage, the gripping member configured to engage the mounting member when the mounting member is received in the passage.

23. The clamping device of claim 18, wherein the actuator and the flexible retaining tab are formed as a single molded piece.

24. The clamping device of claim 18, wherein the actuator is elongated, and the flexible retaining tab extends both longitudinally outward and transverse to a direction of elongation of the actuator, and wherein the flexible retaining tab is configured to engage the complementary retaining member and flex toward the actuator when the actuator is moved from the locked position to the unlocked position.

25. A clamping device comprising:
- a primary member comprising a cylindrical body having a passage configured to receive a mounting member therethrough;
- an actuator mechanism configured to move the primary member to securely engage the mounting member, the actuator mechanism comprising an actuator engaged with the primary member that is moveable between a locked position, where the clamping device is configured to securely engage the mounting member, and an unlocked position, where the clamping device is removable from the mounting member, wherein movement of the actuator from the unlocked position to the locked position is configured to cause the actuator mechanism to move the primary member to securely engage the mounting member, and wherein the actuator comprises first and second arms pivotably connected to the primary member, with a slot defined between the first and second arms, and a handle extending outwardly from the first and second arms; and
- a retaining mechanism configured to releasably retain the actuator in the unlocked position, wherein the retaining mechanism comprises a flexible retaining tab extending outward from the actuator and positioned within the slot between the first and second arms, wherein the flexible retaining tab is configured to engage a complementary retaining member to releasably retain the actuator in the unlocked position,
- wherein the cylindrical body has a first end and a second end spaced from the first end to define a gap, wherein the actuator is connected to the first end and the actuator mechanism further comprises a pulling member connected to the actuator and connected to the second end, such that movement of the actuator from the unlocked position to the locked position is configured to pull the pulling member to pull the first and second ends together and decrease a width of the passage, and movement of the actuator from the locked position to the unlocked position is configured to move the first and second ends apart and increase the width of the passage, and
- wherein the first end of the cylindrical body has a first slot and the second end of the cylindrical body has a second slot, wherein a portion of the actuator is received in the first slot, and a portion of the pulling member is received in the second slot.

26. A clamping device comprising:
- a primary member comprising a cylindrical body extending between first and second ends and having a passage configured to receive a mounting member therethrough;
- an actuator mechanism configured to move the primary member to securely engage the mounting member, the actuator mechanism comprising an actuator connected to the primary member at a pivot connection and a pulling member connected to the primary member at a distal connection and connected to the actuator at an eccentric connection offset from the pivot connection, wherein the actuator is moveable between a locked position, where the primary member is configured to securely engage the mounting member, and an unlocked position, where the primary member is removable from the mounting member, wherein movement of the actuator from the unlocked position to the locked position is configured to move the pulling member to pull the first and second ends of the primary member closer together to cause the primary member to securely engage the mounting member, wherein the actuator is moveable between the locked and unlocked positions by pivoting about the pivot connection, wherein the actuator comprises first and second arms pivotably connected to the primary member at the pivot connection and a handle extending outwardly from the first and second arms, with a slot defined between the first and second arms, and wherein the pulling member is received within the slot and the eccentric connection connects the pulling member to the first and second arms; and a retaining mechanism configured to releasably retain the actuator in the unlocked position, wherein the retaining mechanism comprises a flexible retaining tab extending outward from the actuator and positioned within the slot between the first and second arms, and wherein the retaining mechanism further comprises a complementary retaining member located on the pulling member and configured to engage the flexible retaining tab to releasably retain the actuator in the unlocked position.

27. The clamping device of claim 26, wherein the actuator and the flexible retaining tab are formed as a single molded piece.

28. The clamping device of claim 26, wherein the cylindrical body is formed of a single, integral piece of a metallic material.

29. The clamping device of claim 26, wherein the retaining mechanism is configured to resist movement of the actuator in the unlocked position.

* * * * *